US007418425B2

United States Patent
Yamada et al.

(10) Patent No.: US 7,418,425 B2
(45) Date of Patent: Aug. 26, 2008

(54) INFORMATION PROCESSING SYSTEM, INFORMATION PROCESSING METHOD, ELECTRONIC MONEY SERVICE PROVIDING SYSTEM, AND RECORDING MEDIUM

(75) Inventors: Makoto Yamada, Kanagawa (JP); Nobumitsu Ukai, Tokyo (JP); Junichi Sato, Tokyo (JP); Shigeyuki Kawai, Tokyo (JP); Tsutomu Okude, Ibaraki (JP); Koji Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 1317 days.

(21) Appl. No.: 09/945,476

(22) Filed: Aug. 30, 2001

(65) Prior Publication Data

US 2002/0052838 A1    May 2, 2002

(30) Foreign Application Priority Data

Sep. 1, 2000   (JP)   ............................ P2000-264923

(51) Int. Cl.
G06Q 40/00   (2006.01)
(52) U.S. Cl. .............................. 705/39; 705/38; 705/37; 705/36; 705/26
(58) Field of Classification Search .................. 705/35, 705/37, 38, 36; 380/24, 23; 704/41; 707/104.1
See application file for complete search history.

(56) References Cited

U.S. PATENT DOCUMENTS 5,508,731 A * 4/1996 Kohorn ........................ 725/24
5,878,138 A * 3/1999 Yacobi ......................... 705/69
6,026,388 A * 2/2000 Liddy et al. .................. 707/1
2004/0267820 A1* 12/2004 Boss et al. ............... 707/104.1

FOREIGN PATENT DOCUMENTS

| EP | 0 810 563 A2 | 12/1997 |
| EP | 0 926 637 A2 | 6/1999 |
| JP | 2000-003399 | 1/2000 |
| JP | 2000-020625 | 2/2000 |
| JP | 2000-231595 | 8/2000 |
| WO | WO 99/03079 | 1/1999 |

OTHER PUBLICATIONS

Internet firms can thrive by giving away free services; [1GB Edition] Simon Glynn. Sunday Times. London (UK): Jan. 9, 2000. p. 13.*

* cited by examiner

*Primary Examiner*—Frantzy Poinvil
*Assistant Examiner*—Clement Graham
(74) *Attorney, Agent, or Firm*—Bell, Boyd & Lloyd LLP

(57) ABSTRACT

An electronic money system is provided which requires lower management and running cost, and features higher flexibility. An acquirer/brand holder managing an electronic money brand manages all keys used for authentication processing in the system, and issues the keys as necessary. The acquirer/brand holder distributes keys according to a tie-up agreement to IC card issuers, a POS center, an MMK center, and an affiliate merchant terminal unit. The POS center, the MMK center, and the affiliate merchant terminal unit are apparatuses for users to use the IC cards or for managing them. The acquirer/brand holder, however, does not distribute issued keys to cybershops which users can access by using a personal computer and a reader/writer. Instead, in this case the acquirer/brand holder saves the issued key itself, and carries out authentication processing with a predetermined IC card upon a request from the cybershop.

22 Claims, 21 Drawing Sheets

INFORMATION PROCESSING SYSTEM, INFORMATION PROCESSING METHOD, ELECTRONIC MONEY SERVICE PROVIDING SYSTEM, AND RECORDING MEDIUM

BACKGROUND OF THE INVENTION

1. Field of the Invention

The present invention relates to an information processing system, an information processing method, an electronic money service providing system, and a recording medium. More particularly, the present invention relates to an information processing system, an information processing method, an electronic money service providing system, and a recording medium that allow many issuers and affiliate merchants to participate in one brand and permit a reduction in cost required for distributing cryptographic keys to issuers and the affiliate merchants and for running and managing a system in an electronic money business.

2. Description of the Related Art

More integrated circuit (IC) cards are being used in electronic money systems and security systems. The IC card is a card-shaped device with an IC chip embedded therein, and mainly includes a processing unit, such as a central processing unit (CPU), for performing a variety of types of processing and a memory for storing data necessary for processing. Data is read from or written to the IC card by using a predetermined reader/writer in an electrical contact state or a contactless state in which electromagnetic waves are utilized.

In using IC cards on an electronic money system, a security system, or the like, it is important to ensure security, including the protection of the confidentiality of data and the prevention of the falsification of IC cards. It is necessary, therefore, to manage resources for storing data and to achieve control for flexible access with high security.

An electronic money business involving an IC card is constructed by three functions, namely, a brand holder that manages an electronic money brand, an acquirer that acquires and manages affiliate merchants in the electronic money business, and an issuer that issues IC cards.

Heretofore, an electronic money business has been run by a business unit that integrally implements three functions, namely, a brand holder, an acquirer, and issuer. Alternatively, a plurality of acquirers and a plurality of issuers may enter into partnership with each other to create a single brand holder, with the individual domains being independent.

However, when a single business unit integrally effecting the three functions (a brand holder, an acquirer, and an issuer) runs an electronic money business, the business unit has to assume all the investment in the systems required for running the electronic money business. These investment costs include the cost of hardware resources, such as terminal apparatuses for affiliate merchants, and the cost for issuing and managing IC cards in running the business. The electronic money systems are based on a prepaid system in which users pay in advance or provisionally pay, so that the commission charges cannot be set higher than other settlement methods (e.g., credit cards and debit cards). This has made it difficult to increase profits in relation to the initial investment.

However, when the respective business domains are independent and a plurality of acquirers and a plurality of issuers enter into partnership for a single brand holder to run an electronic money business, the initial investment for running the business can be shared among the business domains, making it possible to reduce the initial investment assumed by each business unit. This, however, leads to a complicated business conformation. Because the electronic money system is run by a plurality of the business units in partnership, it becomes difficult to share the revenue of the entire business among the individual business domains.

In addition, when a single IC card is interactively operated by a plurality of service providers, arrangements must be made so that the information or applications regarding a specific service provided by a certain service provider cannot be accessed without authorization by another service provider interactively operating the IC card. Thus, the information or applications for services to be carried out in cooperation must be made sharable among the service providers in the partnership while maintaining security at the same time.

However, setting up a brand holder, an acquirer, and an issuer discretely so as to make them independent means split business domains. This inevitably results in complicated distribution and management of cryptographic keys used for the authentication processing required when electronic money is loaded into IC cards or electronic money is used at affiliate merchants. This has led to an increase in the cost of maintaining and managing business systems.

SUMMARY OF THE INVENTION

The present invention has been developed in view of the shortcoming of the current state of the art as described above. It is an object of the present invention to enable many issuers and affiliate merchants to participate in a single brand and to permit a reduction in the costs required for distributing cryptographic keys to issuers and affiliate merchants and for running and managing a system therefor in an electronic money business.

To this end, according to one aspect of the present invention, an information processing system is provided that includes a first information processing apparatus managed by a first business entity. The first information processing apparatus performs the management of an electronic money brand in an electronic money service as well as the management of a business entity affiliated in the electronic money service. A first information supplier and receiver supply information to and receive information from a third information processing apparatus managed by a second business entity. The second business entity provides a second information processing apparatus in which electronic money information and authentication information employed for authentication processing for the electronic money service is recorded. A second information supplier and receiver supplies information to and receives information from a fourth information processing apparatus managed by a third business entity. The third business entity provides a service that uses the electronic money. The fourth information processing apparatus includes a first information recorder for recording the authentication information used for the authentication processing for the electronic money service, and a second information recorder for recording the information regarding the second business entity and information regarding a tie-up agreement between the first business entity and the second business entity, and a third information recorder for recording information regarding the third business entity and information regarding a tie-up agreement between the first business entity and the third business entity.

The authentication information may include secret key information to which DES has been applied.

The information processing system may further include a first accounting system for carrying out accounting with the second business party and a second accounting system for carrying out accounting with the third business entity.

The information processing system may further include an authenticating system for carrying out authentication processing by using authentication information recorded by the first information recorder. The authenticating system can be caused to perform authentication processing by using the authentication information regarding the third business entity recorded by the first information recorder if a signal requesting the execution of authentication processing is input from the third business entity through the second information supplier and receiver.

The information processing apparatus may further include a fourth information processing apparatus for rewriting the electronic money information recorded in the first information processing apparatus. A third information supplier and receiver supplies and receives information over a network, and a control signal generator generates a control signal which causes the first information processing apparatus to implement the loading of electronic money. The control signal generator generates a control signal for the first information processing apparatus, which has been issued by the second business entity, according to the information regarding the tie-up agreement between the first business entity and the second business entity recorded by the second information recorder. The third information supplier and receiver outputs the control signal generated by the control signal generator to the fourth information processing apparatus.

The network may be the Internet, and the third information supplier and receiver may exchange information with a fifth information processing apparatus managed by the third business entity, wherein the third business entity owns a virtual store on the Internet.

According to another aspect of the present invention, an information processing method is provided for a first information processing apparatus managed by a first business entity managing a brand of an electronic money service and managing an electronic money service affiliate business entity. The method includes a first information giving and receiving step for giving information to and receiving information from a second information processing apparatus managed by a second business entity. The second business entity issues a portable electronic device in which electronic money information and authentication information used for authentication processing for the electronic money service is recorded. A second information giving and receiving step is performed for giving information to and receiving information from a third information processing apparatus managed by a third business entity that provides a service that uses the electronic money. A first recording step is performed for recording the authentication information used for authentication processing related to the electronic money service. A second recording step is performed for recording the information regarding the second business entity and the information regarding a tie-up agreement between the first business entity and the second business entity. A third recording step is also provided for recording the information regarding the third business entity and the information regarding a tie-up agreement between the first business entity and the third business entity. The processing performed in the first information giving and receiving step generates the authentication information, which is output to and is recorded by the processing of the first recording step, on the basis of the information regarding the tie-up agreement between the first business entity and the second business entity recorded by the processing of the second recording step. The processing performed in the second information giving and receiving step generates the authentication information, which is output to and is recorded by the processing of the first recording step, on the basis of the information regarding the tie-up agreement between the first business entity and the third business entity, recorded by the processing of the third recording step. The aforesaid portable electronic device includes an IC card, a portable telephone incorporating an IC card feature, a portable information terminal, a timepiece, and the like.

According to yet another aspect of the present invention, a recording medium is provided on which a computer-readable program has been recorded. The computer readable program is provided for managing an electronic money brand in an electronic money service and for managing an information processing apparatus operated by a first business entity engaged in acquiring and managing an affiliate business entity of the electronic money service. The program includes a first information giving and receiving step for giving information to and receiving information from a second information processing apparatus operated by a second business entity which issues a first information processing apparatus in which electronic money information and authentication information used for authentication processing for the electronic money service are recorded. The program further includes a second information giving and receiving step for giving information to and receiving information from a third information processing apparatus managed by a third business entity. The third business entity provides a service that uses the electronic money. A first recording step records authentication information used for authentication processing for the electronic money service, and a second recording step records information regarding the second business entity and information regarding a tie-up agreement between the first business entity and the second business entity. A third recording step records information regarding the third business entity and information regarding a tie-up agreement between the first business entity and the third business entity. The processing of the first information giving and receiving step outputs the authentication information, which has been recorded by the processing of the first recording step, on the basis of the information regarding the tie-up agreement between the first business entity and the second business entity that has been recorded by the processing of the second recording step. Similarly, the processing of the second information giving and receiving step outputs the authentication information, which has been recorded by the processing of the first recording step, on the basis of the information regarding the tie-up agreement between the first business entity and the third business entity that has been recorded by the processing of the third recording step.

According to still another aspect of the present invention, a system is provided for providing an electronic money service. The system includes a first information processing apparatus managed by a first business entity which manages an electronic money brand in an electronic money service and is engaged in acquiring and managing an affiliate business entity of the electronic money service. The system further includes a second information processing apparatus in which electronic money information and authentication information used for authentication processing for the electronic money service are recorded. A third information processing apparatus is also provided. The third information processing apparatus is managed by a second business entity issuing the second information processing apparatus. A fourth information processing apparatus is managed by a third business entity providing a service that uses the electronic money. The system is configured such that the first information processing apparatus includes a first information giver and receiver for giving information to and receiving information from the third information processing apparatus managed by the second business entity. A second information giver and receiver is provided for giving information to and receiving information from the fourth information processing apparatus managed by the third business entity. A first recorder records authentication information employed for authentication processing related to the electronic money service, and a second recorder records information regarding the second business entity and information regarding a tie-up agreement between the first business entity and the second business entity. A third recorder records information regarding the third business entity and information regarding a tie-up agreement between the first business entity and the third business entity. The first information giver and receiver outputs the authentication information, which has been recorded by the first recorder, on the basis of the information regarding the tie-up agreement between the first business entity and the second business entity that has been recorded by the second recorder. The second information giving and receiving means outputs the authentication information, which has been recorded by the first recorder, on the basis of the information regarding the tie-up agreement between the first business entity and the third business entity that has been recorded by the third recorder. The second information processing apparatus includes a fourth recorder for recording the authentication information, which has been output to the third information processing apparatus, by the first information giver and receiver. Finally, a fifth recorder records the electronic money information. The third information processing apparatus includes a third information giver and receiver for giving information to and receiving information from the first information processing apparatus. A sixth recorder records the authentication information input by the third information giver and receiver. A seventh recorder records the information regarding the issuance of the second information processing apparatus, and a first authentication processor executes authentication processing with the second information processing apparatus on the basis of the authentication information recorded by the sixth recorder. The fourth information processing apparatus includes a fourth information giver and receiver for giving information to and receiving information from the first information processing apparatus. An eighth recorder records the authentication information input by the fourth information giver and receiver, and a second authentication processor executes authentication processing with the second information processing apparatus on the basis of the authentication information recorded by the eighth recorder.

The third information processing apparatus may further include a plurality of fifth information processing apparatuses for executing the processing for rewriting electronic money to information recorded by the fifth recorder of the second information processing apparatus, and a fifth information giver and receiver for giving and receiving information. In this case, the first authentication processor executes authentication processing on the basis of the authentication information recorded by the fourth recorder of the second information processing apparatus that has been input by the fifth information giver and receiver.

The fourth information processing apparatus may further include a plurality of fifth information processing apparatuses for executing the processing for rewriting electronic money information recorded by the fifth recorder of the second information processing apparatus, and fifth information giver and receiver for giving and receiving information, wherein the second authentication processor executes authentication processing on the basis of the authentication information recorded by the fourth recorder of the second information processing apparatus that has been input by the fifth information giver and receiver means.

The fourth information processing apparatus may further include a fifth information giver and receiver for giving information to and receiving information from the second information processing apparatus. The fourth information processing apparatus may also include a control signal generator for generating a control signal for rewriting electronic money information recorded by the fifth recorder of the second information processing apparatus, wherein the second authentication processor executes authentication processing on the basis of the authentication information recorded by the fourth recorder of the second information processing apparatus that has been input by the fifth information giver and receiver.

The second information processing apparatus may further include a ninth recorder for recording an application for implementing at least one function among: a personal authentication card; an entering and leaving key; a commuter ticket; a point card; a membership card; a cash card; a credit card; and a loan card.

In the embodiment of the invention, the second information processing apparatus may be a contactless type IC card, a contact type IC card, a portable telephone, a PDA, a personal computer, or a timepiece.

In the information processing system, the information processing method, and the program recorded in a recording medium in accordance with the present invention, information is exchanged with a second information processing apparatus managed by a second business entity issuing a first information processing apparatus in which electronic money information and the authentication information used for authentication processing for an electronic money service are recorded. Information is also exchanged with a third information processing apparatus managed by a third business entity which provides a service that uses electronic money. Authentication information used for authentication processing related to electronic money is recorded, information regarding the second business entity, and information regarding a tie-up agreement between the first business entity and the second business entity are recorded. Information regarding the third business entity and information regarding a tie-up agreement between the first business entity and the third business entity are also recorded. Authentication information is output on the basis of information regarding the tie-up agreement between the first business entity and the second business entity, and authentication information is output on the basis of the information regarding the tie-up agreement between the first business entity and the third business entity.

In the electronic money service providing system in accordance with the present invention, information is exchanged with a third information processing apparatus managed by a second business entity. Information is exchanged with a fourth information processing apparatus managed by a third business entity, and authentication information used for authentication processing related to an electronic money service is recorded. The information regarding the second business entity and the information regarding a tie-up agreement between the first business entity and the second business entity are also recorded, as are information regarding a third business entity and information regarding a tie-up agreement between the first business entity and the third business entity. Authentication information is output on the basis of the information regarding a tie-up agreement between the first business entity and the second business entity, and authentication information is output on the basis of the information regarding a tie-up agreement between the first business entity and the third business entity in a first information processing apparatus. Authentication information is recorded and electronic money information is recorded in a second information processing apparatus. Information is exchanged with the first information processing apparatus, input authentication information is recorded, and the information regarding the issuance of the second information processing apparatus is recorded. Authentication processing with the second information processing apparatus is carried out on the basis of the recorded authentication information in a third information processing apparatus. Finally, information is exchanged with the first information processing apparatus, input authentication information is recorded, and authentication processing with the second information processing apparatus is carried out on the basis of the recorded authentication information in a fourth information processing apparatus.

Additional features and advantages of the present invention are described in, and will be apparent from, the following Detailed Description of the Invention and the figures.

DETAILED DESCRIPTION OF THE INVENTION

The following will describe the embodiments of the present invention with reference to the accompanying drawings.

Figure 1:
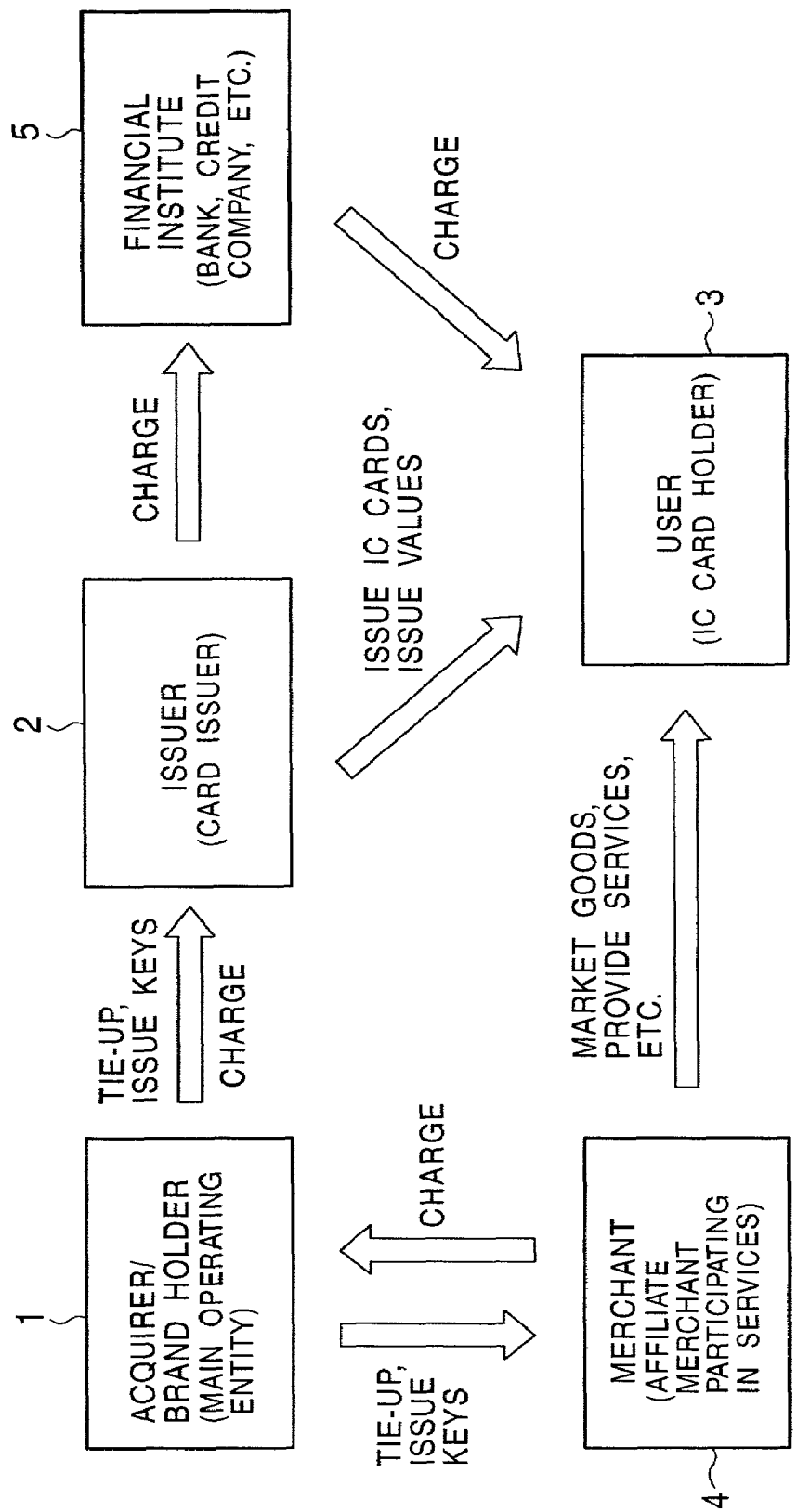
FIG. 1 is a diagram illustrating the configuration of an electronic money service providing system to which the present invention has been applied.

FIG. 1 shows the configuration of an electronic money system to which the present invention has been applied. An acquirer/brand holder 1 acting as an operating main unit runs the operation of a service related to electronic money of its own brand (hereinafter referred to as "the service"). The acquirer/brand holder 1 manages all keys required for an issuer 2 and a merchant 4 having a tie-up for the service to carry out a variety of types of processing related to the electronic money of the brand run and managed by the acquirer/brand holder 1, and issues the keys to the issuer 2 or the merchant 4, as necessary. Acquiring the merchant 4 participating in the service is one of the duties of the acquirer/brand holder 1.

The keys issued from the acquirer/brand holder 1 are secret keys, and conform to, for example, data encryption standard (DES) or the like. The DES is an encrypting system for encrypting and decrypting data by delimiting the data by every 64 bits. According to a DES algorithm, encryption and decryption are symmetrical, and a received encrypted text can be converted again using the same key to restore original information.

According to the DES, simple bit position transposition and XOR operation combinational logic is repeated sixteen times. Internally, there is no data feedback or conditional decisions, and processing is sequential. Hence, fast processing can be accomplished by pipeline processing. The DES is an algorithm originally designed for an LSI, and numerous DES chips are available.

The issuer 2 is, for example, a bank, a credit card company, a railroad company, or other business entity. The issuer 2 that has a tie-up with the acquirer/brand holder 1 may incorporate the functions, which are related with the electronic money of a brand managed and run by the acquirer/brand holder 1, in an IC card or the like issued by the issuer 2 according to the tie-up agreement thereof, and may also incorporate a key issued by the acquirer/brand holder 1.

The hardware issued by the issuer 2 is not limited to an IC card. As the hardware, diverse information processing devices, e.g., portable telephones, personal digital (data) assistants (PDA's), personal computers, or timepieces, may be used as long as they have the functions for implementing various types of processing for the electronic money of the brand managed and run by the acquirer/brand holder 1 and are capable of securely holding keys. In this case, the descriptions will be given on an assumption that the hardware issued by the issuer 2 is an IC card.

The IC card issued by the issuer 2 may carry a function other than the one for electronic money. For example, the IC card may also carry a function of, for example, a personal authentication exemplified by an employee ID, an entering and leaving card (electronic key) for a building or room, a commuter ticket, a point card, a membership card, a cash card, a credit card, or a loan card. In other words, the application software for implementing these functions can be recorded in the IC card.

A user 3, that is, the owner of the IC card, may record the value, i.e., electronic money, issued by the issuer 2 in the IC card issued by the issuer 2. The cost corresponding to the electronic money can be settled by cash, a credit card, withdrawal from the deposit of a bank account, etc. The user 3 can enjoy consumption activities, such as purchasing goods or using a service by using the electronic money recorded in the IC card at the merchant 4 participating in the service.

By entering into a partnership with the acquirer/brand holder 1, the merchant 4 receives the keys required for the authentication processing to exchange various types of information with IC cards, and provides a variety of services to the user 3 according to a tie-up agreement.

The merchant 4 sends a bill for goods or service obtained by the user 3 by using the IC card to the acquirer/brand holder 1. The acquirer/brand holder 1 invoices the issuer 2. If electronic money for the IC card owned by the user 3 is issued in exchange of the receipt of cash, then the issuer 2 will already have obtained the money for the electronic money issued. On the other hand, if the electronic money issued is paid by a credit card or the withdrawal from the deposit of a bank account, etc., then the issuer 2 sends an invoice covering the cost for the issued electronic money to a financial institution 5, such as a bank or a credit company. The financial institution 5 invoices the user 3, who has received the issued electronic money, for the charge of the electronic money according to the same invoicing method as a conventional invoicing method used for the user 3 that employs a payment method, such as a credit card or the withdrawal from the deposit of a bank account.

Figure 2:
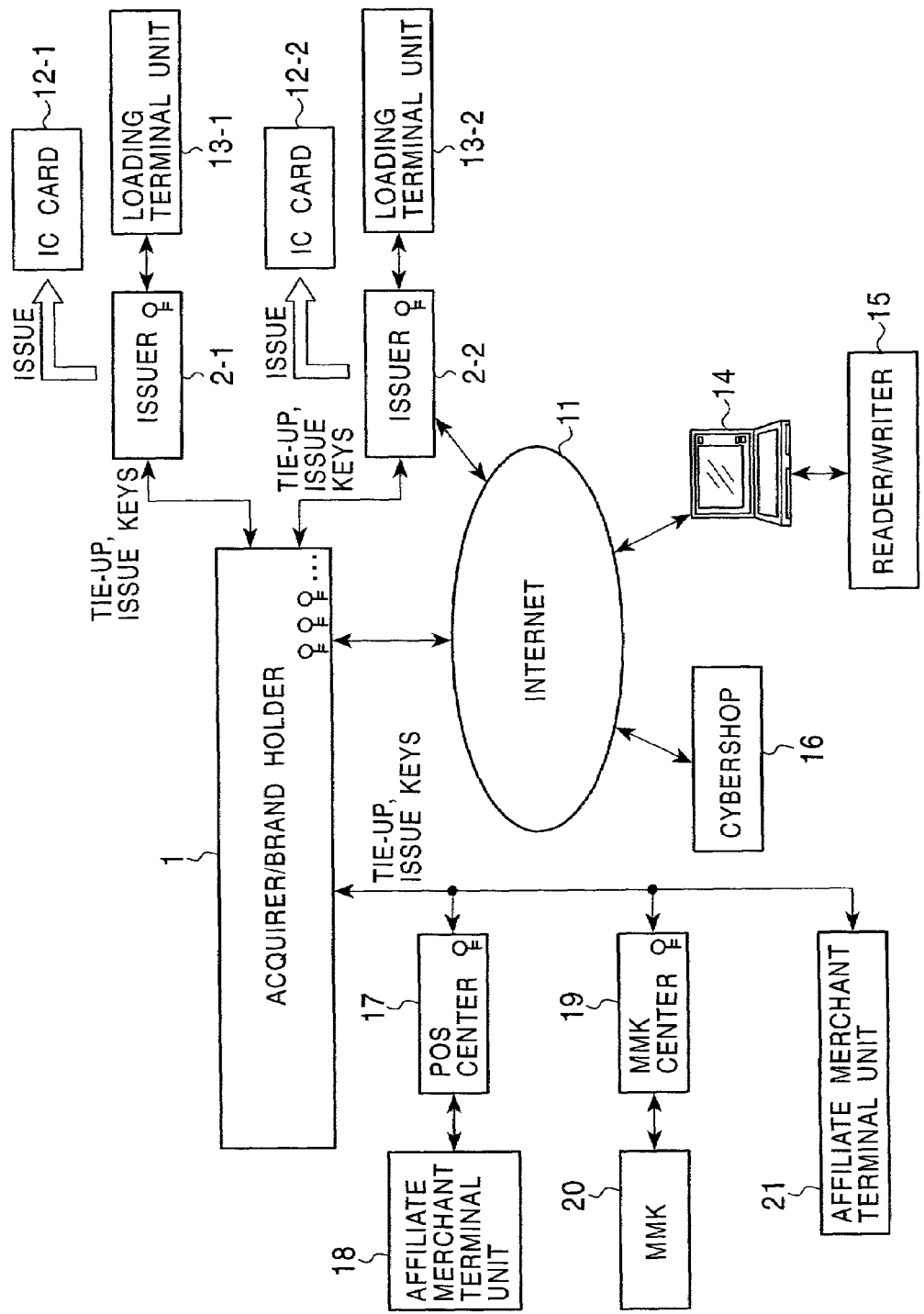
FIG. 2 is a diagram illustrating the configuration of network connection in the electronic money service providing system, and also illustrating the issuance of keys by an acquirer/brand holder.

Referring to FIG. 2, the descriptions will now be given of the configuration of the network connections among the acquirer/brand holder 1, the issuer 2, various terminal units installed at the merchant 4 that has participated in the service, a cybershop that is opened on the Internet and has a tie-up for the service, and a personal computer owned by the user 3. The issuance of the keys by the acquirer/brand holder 1 will also be described.

The acquirer/brand holder 1 issues predetermined keys to issuers 2-1 and 2-2 in partnership therewith according to a tie-up agreement. The issuer 2-1 does not directly provide a service to the user 3 over an Internet 11, while the issuer 2-2 does. The issuer 2-1 issues an IC card 12-1, which holds a key issued by the acquirer/brand holder 1 therein, to the user 3. The issuer 2-1 also manages a loading terminal unit 13-1 for loading electronic money into the IC card 12-1. Similarly, the issuer 2-2 issues an IC card 12-2, which holds a key issued by the acquirer/brand holder 1 therein, to the user 3, and also manages a loading terminal unit 13-2 for loading electronic money into the IC card 12-2.

In this case, the descriptions have been given on an assumption that the two issuers, namely, the issuer 2-1 and the issuer 2-2, are in partnership with the acquirer/brand holder 1. The fact, however, is that a plurality of issuers that do not provide the user 3 with a service over the Internet 11 and a plurality of issuers that provide the user 3 with a service over the Internet 11 have tie-ups with the acquirer/brand holder 1, and individually receive issued keys according to a tie-up agreement and issue IC cards, which hold the keys therein, to the users 3. In the description given below, unless it is necessary to discriminate the issuers 2-1 and 2-2, the issuers will be generically referred to simply as "the issuer 2". Unless it is necessary to discriminate the IC cards 12-1 and 12-2, the IC cards will be generically referred to simply as "the IC card 12". Similarly, unless the loading terminal units 13-1 and 13-2 must be discriminated, they will be generically referred to simply as "the loading terminal unit 13".

The acquirer/brand holder 1 issues a key according to a tie-up agreement so as to enable the user 3 to use the IC card 12 at the merchant 4 having a tie-up on a service, that is, to enable the exchange of information between the IC card 12 and the terminal unit installed at the merchant 4. The methods whereby the acquirer/brand holder 1 issues keys to the merchant 4 are roughly classified into three types.

For example, when a corporation having a plurality of merchants 4, typically represented by chain store merchants, obtains a tie-up for the service, the acquirer/brand holder 1 issues and distributes keys to a point-of-sale (POS) center 17 that has control over the merchants. An affiliate merchant terminal unit 18 installed at each merchant 4 that is managed by the POS center 17 (only one affiliate merchant terminal unit 18 is shown in FIG. 2; in reality, however, the affiliate merchant terminal units 18 are installed at a plurality of merchants 4) is connected with the POS center 17 by using, for example, a dedicated line. Thus, when the user 3 uses the electronic money for the service in the affiliate merchant terminal unit 18, the affiliate merchant terminal unit 18 connects to the POS center 17 thereby to carry out authentication processing with the IC card 12.

If the affiliate merchant terminal unit 18 employs an advanced tamperproof technology (a technology for physically and logically preventing an internal analysis or falsification of a semiconductor chip or the like), then the keys distributed to the POS center 17 may be stored in the individual affiliate merchant terminal units 18 so as to implement authentication processing between the affiliate merchant terminal units 18 and the IC card 12.

Although FIG. 2 shows only one POS center 17, it is needless to say that a plurality of POS centers 17 may receive keys issued from the acquirer/brand holder 1 according to a tie-up agreement and carry out the authentication processing between the affiliate merchant terminal units 18 managed by the POS centers 17 and the IC cards 12.

For instance, when the service is provided at a multi-media KIOSK (MMK) 20 installed at a convenience store or a station, the acquirer/brand holder 1 issues and distributes keys to an MMK center 19 that has control over the MMK 20 installed at each merchant 4.

The MMK 20, which is a type of multi-media terminal, is a multifunctional terminal that combines an automatic teller machine (ATM) and a terminal having such functions as proxy payment of public utility charges and electronic commerce (EC). The MMK 20 is connected with the MMK center 19 by using, for example, a dedicated line. While FIG. 2 shows only one MMK 20, the MMK's 20 are actually installed at a plurality of merchants 4. When the user 3 uses the electronic money for the service at the MMK 20, the MMK 20 connects to the MMK center 19 so as to perform authentication processing with the IC card 12. Alternatively, as in the case with the affiliate merchant terminal unit 18, if the MMK 20 employs an advanced tamperproof technology, then keys may be stored at the individual MMK's 20 to perform the authentication processing between the MMK's 20 and the IC card 12.

If the MMK 20 has a function for providing the service of loading electronic money into the IC card 12, then the MMK center 19 is connected to an associated issuer 2 so as to permit the exchange of information regarding the accounting generated from the electronic money loading service.

Although FIG. 2 shows only one MMK center 19, it is obvious that a plurality of MMK centers 19 may receive keys issued from the acquirer/brand holder 1 according to a tie-up agreement thereby to perform the authentication processing between the MMK 20, which is managed by the MMK centers 19, and the IC card 12.

If independent merchants 4 having no central organization controlling them independently enter into partnership for the service, then the acquirer/brand holder 1 issues and distributes keys to affiliate merchant terminal units 21 installed at the respective merchants 4. The affiliate merchant terminal units 21 store the keys to implement the authentication processing between the affiliate merchant terminal units 21 and the IC card 12.

Alternatively, the acquirer/brand holder 1 may be online-connected with the affiliate merchant terminal units 21 so as to record keys in the acquirer/brand holder 1 rather than distributing the keys to the affiliate merchant terminal units 21. The affiliate merchant terminal units 21 transmit authentication information to the acquirer/brand holder 1 to request the execution of authentication processing before starting various types of processing with the IC card 12. This may generate cost for the processing of each transaction, but obviate the need for introducing an advanced tamper-proof technology into the affiliate merchant terminal units 21.

Although FIG. 2 shows only one affiliate merchant terminal unit 21, it is obvious that a plurality of affiliate merchant terminal units 21 may receive keys issued from the acquirer/brand holder 1 according to a tie-up agreement thereby to carry out the authentication processing with the IC card 12.

The user 3 may use a reader/writer 15 connected to a personal computer 14 to exchange information with the IC card 12. This enables the user 3 to connect to, for example, the issuer 2-2 over the Internet 11 thereby to load electronic money or purchase goods at a cybershop 16 opened on the Internet 11 without going to the merchant 4. The cybershop 16 is connected to the Internet 11 and introduces its goods or services or exhibits web content for sale on the Internet 11. The personal computer 14, the reader/writer 15, and the cybershop 16 can exchange information with the IC card 12 over the Internet 11, thereby providing a variety of services to the user 3.

The cybershop 16 accepts the issuance of keys according to a tie-up agreement with the acquirer/brand holder 1, but does not accept the supply of the issued keys. The acquirer/brand holder 1 saves the keys issued to the cybershop 16 and implements the authentication processing with a predetermined IC card 12 upon request from the cybershop 16. In other words, the system is adapted not to supply keys over the Internet 11.

FIG. 2 shows only one each of cybershop 16, the personal computer 14, and the reader/writer 15, and the descriptions have been given thereof. Obviously, however, an alternative arrangement may be made so that a plurality of cybershops 16 accept the issuance of keys from the acquirer/brand holder 1 and receive the input of the authentication information from the IC card 12 through the intermediary of the reader/writer 15, the personal computer 14, and the Internet 11 according to a tie-up agreement thereof, and send a request for authentication processing to the acquirer/brand holder 1 thereby to provide diverse services to the user 3.

Preferably, the information, including the keys, described in conjunction with FIG. 2 is exchanged by communication through a dedicated line as much as possible, attaching importance to security. If, however, a wide area network, such as the Internet 11, is inevitably used in some connection, then the information transferred is encrypted using, for example, a secure sockets layer (SSL).

For especially important information, such as authentication information, including keys, and the information regarding the balance of the electronic money of the IC card 12, the system's own encrypting and decrypting rules may be established to exchange information according to the rules. In the communication of the information, if it is unavoidable to use a wide area network such as the Internet 11, then the information to be exchanged may be encrypted according to the system's own rules and further encrypted according to the SSL.

The keys supplied from the acquirer/brand holder 1 may be saved in, for example, a magnetic disk (including a floppy disk), an optical disk (including a CD-ROM (Compact Disk-Read Only Memory)) and a DVD (Digital Versatile Disk)), a magneto-optical disk (including a MD (Mini-Disk), or a removable medium, such as a semiconductor memory, and distributed to the issuer 2, the POS center 17, the MMK center 18, or the affiliate merchant terminal unit 21.

By constructing such a system, the merchant 4, a corporation having many merchants 4 (e.g., a convenience store), or a corporation that operates in the form of the MMK 20 or the cybershop 16 on the Internet 11 rather than having the merchant 4 as an actual outlet store, can select services that are in line with its businesses and provide them to the user 3 through the system. The system also enables the user 3 to select the issuer 2 that issues the IC card 12 having a tie-up on the service that the user 3 wishes to use, and receive the IC card 12 issued.

Furthermore, although the system features such a high degree of flexibility, the management of the brands of electronic money and the keys used for authentication processing is centralized. It is possible, therefore, to control the management and running cost of the entire system and to realize secure exchange of information.

As described in conjunction with FIG. 2, the keys based on tie-up agreements are issued and supplied from the acquirer/brand holder 1 to the issuer 2, the POS center 17, the MMK center 18, and the affiliate merchant terminal units 21 that have tie-ups for the service. The loading terminal unit 13, the affiliate merchant terminal units 18 and 21, and the MMK 20 individually include a reader/writer and a controller for controlling the reader/writer, and are adapted to perform communication with the IC card 12 in a contactless mode or an electrical contact mode. In this case, it is assumed that the IC card 12 and the reader/writer carry out contactless communication, and the loading terminal unit 13, the affiliate merchant terminal units 18 and 21, and the MMK 20 individually include a reader/writer 31 and a controller 32 shown in FIG. 3.

Figure 3:
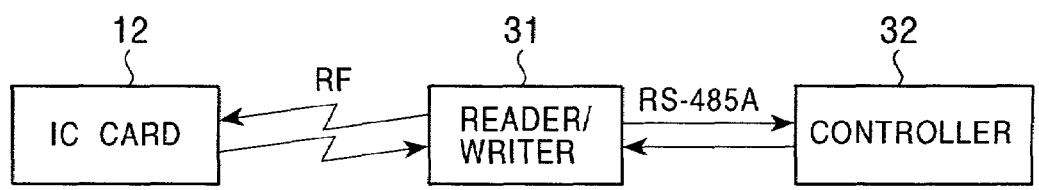
FIG. 3 is a diagram illustrating an IC card, a reader/writer, and a controller.

In a contactless card system shown in FIG. 3, data is transferred between the reader/writer 31 and the IC card 12 in the contactless mode by using electromagnetic waves. More specifically, the reader/writer 31 transmits a predetermined command to the IC card 12, and the IC card 12 receives the command and carries out the processing based on the command. The IC card 12 then transmits response data based on the result of the processing to the reader/writer 31.

The reader/writer 31 is connected to the controller 32 through the intermediary of a predetermined interface (e.g. an interface conforming to the RS-485A standard, etc.). The controller 32 supplies a predetermined control signal to the reader/writer 31 thereby to cause the reader/writer 31 to perform predetermined processing.

Figure 4:
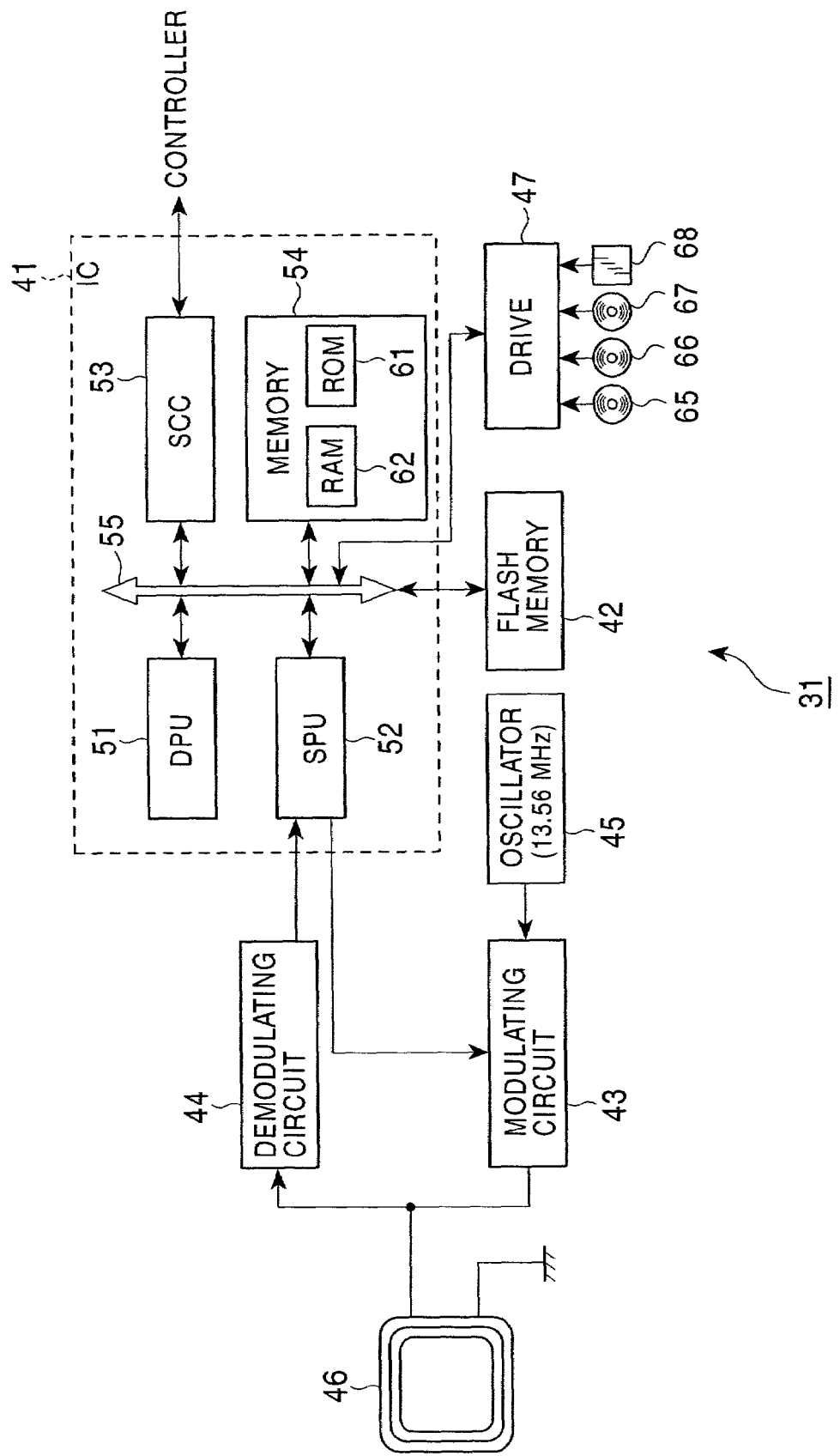
FIG. 4 is a block diagram showing the configuration of the reader/writer shown in FIG. 3.

FIG. 4 is a block diagram showing the configuration of the reader/writer 31. The reader/writer 15 shown in FIG. 2 basically shares the configuration similar to that of the reader/writer 31 shown in FIG. 4; therefore, the description thereof will be omitted.

An IC 41 is constructed to provide a data processing unit (DPU) 51 for processing data, a signal processing unit (SPU) 52 for processing the data to be transmitted to the IC card 12 and the data received from the IC card 12, a serial communication controller (SCC) 53 for performing communication with the controller 32, and a memory 54 having a read only memory (ROM) 61 for storing beforehand information necessary for processing data and a random access memory (RAM) 62 for temporarily storing data under processing. The components from the DPU 51 through the memory 54 are interconnected through a bus 55.

A flash memory 42 for storing predetermined data, including, for example, the data necessary for authentication (e.g. the keys or the like supplied from the acquirer/brand holder 1), and a drive 47 are also connected to the bus 55. The drive 47 is equipped with a magnetic disk 65, an optical disk 66, a magneto-optical disk 67, and a semiconductor memory 68, as necessary, to exchange data.

An antenna 46 monitors a load by radiating predetermined electromagnetic waves to detect whether the IC card 12 has been set, and exchanges data with the set IC card 12. The exchange of data with the IC card 12 will be discussed in detailed hereinafter.

A demodulating circuit 44 demodulates the modulated waves, namely, amplitude shift keying (ASK) modulated waves, received through the antenna 46, and outputs the demodulated data to the SPU 52.

The SPU 52 receives response data, which has been transmitted from the IC card 12, through the demodulating circuit 44, and implements predetermined processing, such as binary phase shift keying (BPSK) modulation (e.g., coding into Manchester codes) on the data. Similarly, the SPU 52 also carries out predetermined processing on a command to be transmitted to the IC card 12, then outputs the result to a modulating circuit 43.

A DPU 51 receives the response data from the IC card 12 through the intermediary of the SPU 52 and the bus 55, or a control signal input from the controller 32 through the intermediary of the SCC 53 and the bus 55, performs the processing based on the received response data or control signal. The DPU 51 outputs a command, which is to be transmitted to the IC card 12, to the SPU 52 through the intermediary of the bus 55, or outputs the data, which is to be supplied to the controller 32, to the SCC 53 through the intermediary of the bus 55.

The modulating circuit 43 performs the ASK modulation on carrier waves of a predetermined frequency (e.g., 13.56 MHz) supplied from the oscillator (OSC) 45 on the basis of the data supplied from the SPU 52, and outputs the generated modulated waves, as electromagnetic waves, to the IC card 12 through the antenna 46. At this time, the modulating circuit 43 performs the ASK modulation with a modulation degree below 1, thereby preventing the maximum amplitude of modulated waves from becoming zero even if data is of a low level.

The SCC 53 supplies the data received from the controller 32 to the DPU 51 through the intermediary of the bus 55, or outputs the data received from the DPU 51 through the intermediary of the bus 55 to the controller 32.

Figure 5:
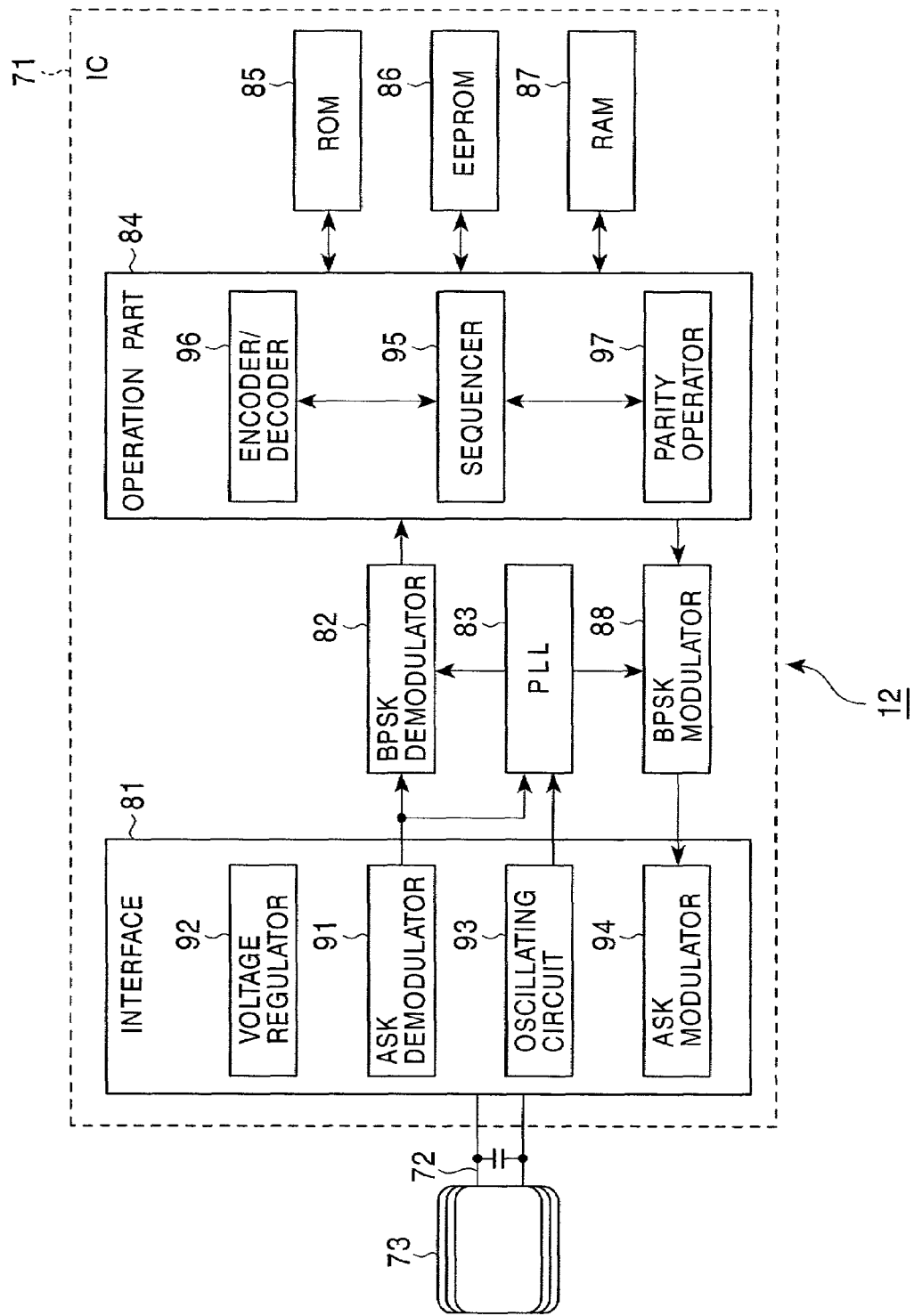
FIG. 5 is a block diagram showing the configuration of the IC card shown in FIG. 3.

FIG. 5 is a block diagram showing the configuration of the IC card 12 shown in FIG. 1.

An IC 71 of the IC card 12 receives, through the antenna 73, modulated waves transmitted from the reader/writer 31 or the reader/writer 15. A capacitor 72 constitutes an LC circuit together with the antenna 73, and tunes to or resonates with electromagnetic waves of a predetermined frequency (carrier frequency).

An interface 81 of the IC 71 detects and demodulates the modulated waves or ASK-modulated waves received via the antenna 73, and outputs the demodulated data to a BPSK demodulator 82 and a phase locked loop (PLL) 83. The interface 81 also stabilizes, by using a voltage regulator 92, the signals detected by an ASK demodulator 91, and supplies the stabilized signals as DC power to individual circuits. Furthermore, the interface 81 produces signals of the same frequency as the clock frequency of data by using an oscillating circuit 93, and outputs the produced signals to the PLL 83.

To transmit data from the IC card 12 to the reader/writer 31, an ASK modulator 94 of the interface 81 turns ON/OFF, for example, a predetermined switching device on the basis of the data supplied from an operation part 84 through the intermediary of a BPSK modulator 88, and connects a predetermined load in parallel to the antenna 73 only when the switching device is ON so as to vary the load on the antenna 73 acting as a power source of the IC card 12. In response to a change in the load on the antenna 73, the ASK modulator 94 carries out the ASK modulation on the modulated waves received through the antenna 73. When the reader/writer 31 receives data from the IC card 12, i.e., when the IC card 12 transmits data, the maximum amplitude of the output modulated waves is maintained at a fixed level, and the modulated waves are subjected to the ASK modulation at a change in the load on the antenna 73. The modulated components are transmitted to the reader/writer 31 via the antenna 73. In other words, a terminal voltage of the antenna 46 of the reader/writer 31 is changed.

From the data supplied from the ASK demodulator 91, the PLL 83 generates a clock signal synchronized to the data, and outputs the clock signal to the BPSK demodulator 82 and the BPSK demodulator 88. If the data demodulated by the ASK demodulator 91 is BPSK-modulated, then the BPSK demodulator 82 performs demodulation (decoding of Manchester codes) on the data on the basis of the clock signal supplied from the PLL 83, and outputs the demodulated data to the operation part 84.

If the data supplied from the BPSK demodulator 82 has been encoded, then the operation part 84 decodes the data by the encoder/decoder 96, then processes the data by a sequencer 95. If the data has not been encoded, then the data supplied from the BPSK demodulator 82 is directly supplied to the sequencer 95 without the intermediary of the encoder/decoder 96.

The sequencer 95 implements various types of processing on the basis of received commands. More specifically, the sequencer 95, for example, writes/reads data to/from an electrically erasable and programmable read only memory (EEPROM) 86, and carries out other necessary operational processing on data. Furthermore, the sequencer 95 controls the access to the EEPROM 86 by carrying out authentication, and conducts control over the EEPROM 86.

A parity operator 97 of the operation part 84 calculates, for example, a Reed-Solomon code, as a parity from the data to be stored in the EEPROM 86 or the data stored in the EEPROM 86. After implementing predetermined processing by the sequencer 95, the operation part 84 outputs response data based on the processing, that is, the data to be transmitted to the reader/writer 31, to the BPSK modulator 88. The BPSK modulator 88 performs BPSK modulation on the data supplied from the operation part 84, and outputs the modulated data to the ASK modulator 94 of the interface 81.

A ROM 85 stores programs for the sequencer 95 to implement processing and the data necessary for running the programs. A RAM 87 temporarily stores data or the like while the sequencer 95 is performing processing. The EEPROM 86 is a nonvolatile memory, and continues to store data after the IC card 12 finishes communication with the reader/writer 31 and the power supply is interrupted.

The processing for the transfer of data between the reader/writer 31 and the IC card 12 will now be described.

The reader/writer 31 described in conjunction with FIG. 4 monitors the load on the antenna 46 in a state where predetermined electromagnetic waves are radiated from the antenna 46, and stands by until it detects a change in the load caused by the approach of the IC card 12. As an alternative, the reader/writer 31 may perform processing (polling) wherein a predetermined short pattern of data in an ASK-modulated electromagnetic wave is radiated thereby to repeatedly issue a call to the IC card 12 until it receives a response from the IC card 12 within a predetermined time.

When the reader/writer 31 detects the approach of the IC card 12, the SPU 52 of the reader/writer 31 carries out the BPSK modulation on the data to be transmitted to the IC card 12 (e.g., a command for the processing to be performed by the IC card 12, and the data to be written to the IC card 12), using a rectangular wave of a predetermined frequency (e.g., a frequency that is twice the clock frequency of data) as a carrier wave. The generated modulated wave (a BPSK-modulated signal) is output to the modulating circuit 43.

During the BPSK modulation, it is possible to accommodate data to phase changes of modulated waves by utilizing differential conversion. In this case, even if a BPSK-modulated signal is inverted, demodulation to original data is possible, thus obviating the need for the consideration of the polarity of modulated waves.

The modulating circuit 43 carries out the ASK modulation on the received BPSK-modulated signal at a modulation degree (=max. amplitude of data signal/max. amplitude of carrier wave) below 1(e.g., 0.1). The generated modulated wave, which is an ASK-modulated wave, is transmitted to the IC card 12 through the antenna 46.

When no transmission is performed, the modulating circuit 43 is adapted to generate modulated waves at, for example, high level between two levels, namely, high level and low level, of digital signals.

In the IC card 12 described in conjunction with FIG. 5, the LC circuit constructed by the antenna 73 and the capacitor 72 converts a part of the electromagnetic wave radiated by the antenna 46 of the reader/writer 31 into an electrical signal. The electrical signal (modulated wave) is output to the interface 81 of the IC 71. The ASK demodulator 91 of the interface 81 rectifies and smoothes the modulated wave to perform envelope detection, and supplies the signal generated thereby to the voltage regulator 92. The ASK demodulator 91 also suppresses the DC component of the signal to extract a data signal, and outputs the data signal to the BPSK demodulator 82 and the PLL 83.

At this time, a terminal voltage V0 of the antenna 73 is represented by, for example, expression (1) shown below:

$$V0 = V10\,(1 + k \times Vs(t))\cos((t)) \quad (1)$$

where $V10\cos((t))$ denotes a carrier wave, k denotes a modulation degree, and Vs(t) denotes the data output by the SPU 52.

A low-level value VLR at a voltage V1 after the rectification by the ASK demodulator 91 is represented by, for example, expression (2) shown below:

$$VLR = V10\,(1 + k \times (-1)) - Vf \quad (2)$$

where Vf denotes a voltage drop in a diode (not shown) constituting a rectifying circuit for rectifying and smoothing in the ASK demodulator 91, and is typically about 0.7 volts.

Upon receipt of the signal that has been rectified and smoothed by the ASK demodulator 91, the voltage regulator 92 stabilizes the signal and supplies it as a DC power source to individual circuits, including the operation part 84. In this case, as mentioned above, since the modulation degree k of the modulated wave is below 1, the fluctuation in voltage, i.e., the difference between the high level and the low level, after rectification is small. Hence, a DC power source can be easily generated in the voltage regulator 92.

If, for example, a modulated wave having the modulation degree k of 5% is received so that V10 is 3 volts or more, then the low-level voltage VLR after rectification will be 2.15 (=3×(1−0.05)−0.7) volts or more, and the voltage regulator 92 will be able to supply a voltage that is sufficient as a power source to the circuits. Furthermore, in this case, an amplitude 2×k×V10 (peak-to-peak value) of the AC component (data component) of the voltage V1 after rectification will be 0.3 (=2×0.05×3) volts or more, allowing the ASK demodulator 91 to demodulate the data at a sufficiently high S/N ratio.

Thus, utilizing the ASK-modulated waves having the modulation degree k below 1 accomplishes communication with a lower error rate, i.e., a higher S/N ratio, and also supplies a DC voltage, which is adequate as a power source, to the IC card 12.

Upon receipt of data (BPSK-modulated signal) from the ASK demodulator 91, the BPSK demodulator 82 demodulates the data according to the clock signal supplied from the PLL 83, and outputs the demodulated data to the operation part 84.

If the data supplied from the BPSK demodulator 82 has been encoded, then the operation part 84 decodes it by using the encoder/decoder 96, and supplies the data to the sequencer 95 for further processing. During that time, i.e., from the moment the data is transmitted to the IC card 12 to the moment a response thereto is received, the reader/writer 31 stands by after the data having a value of 1 is transmitted. Accordingly, during that time, the IC card 12 receives modulated waves having a fixed maximum amplitude.

Upon completion of processing, the sequencer 95 outputs response data mainly relating to a result of the processing (the data to be transmitted to the reader/writer 31) to the BPSK modulator 88. The BPSK modulator 88 carries out the BPSK modulation (coding into Manchester codes) on the received data, then outputs the modulated data to the ASK modulator 94 of the interface 81.

Subsequently, the ASK modulator 94 changes the load connected to both ends of the antenna 73 according to the data from the BPSK modulator 88 by using a switching device or the like thereby to perform the ASK modulation on the received modulated wave (the maximum amplitude of the modulated wave output from the reader/writer 31 is fixed when data is transmitted by the IC card 12, as mentioned above) according to the data to be transmitted. Thus, a terminal voltage of the antenna 46 of the reader/writer 31 is changed, and the data is sent to the reader/writer 31.

Meanwhile, the modulating circuit 43 of the reader/writer 31 continues to transmit data having a value of 1 (high level) while receiving data from the IC card 12. In the demodulating circuit 44, the data transmitted from the IC card 12 is detected from a very small fluctuation (e.g., several tens of microvolts)

in the terminal voltage of the antenna 46 electromagnetically connected to the antenna 73 of the IC card 12.

In the demodulating circuit 44, the detected signal (the ASK-modulated wave) is amplified by a high-gain amplifier (not shown) and demodulated, then the resulting digital data is output to the SPU 52. The SPU 52 demodulates the received data (the BPSK-modulated signal) and outputs the demodulated data to the DPU 51 through the bus 55. The DPU 51 processes the data received from the SPU 52, and determines whether the communication should be terminated or not according to the result of the processing. If the DPU 51 determines that the communication should be performed again, then the communication between the reader/writer 31 and the IC card 12 is performed in the same manner as described above. Conversely, if the DPU 51 determines that the communication is to be terminated, then the processing for the communication between the reader/writer 31 and the IC card 12 is terminated.

Thus, the reader/writer 31 utilizes the ASK modulation, wherein the modulation degree k is below 1, to transmit data to the IC card 12, and the IC card 12 receives the data and implements the processing associated with the data, then returns the data based on a result of the processing to the reader/writer 31.

Figure 6:
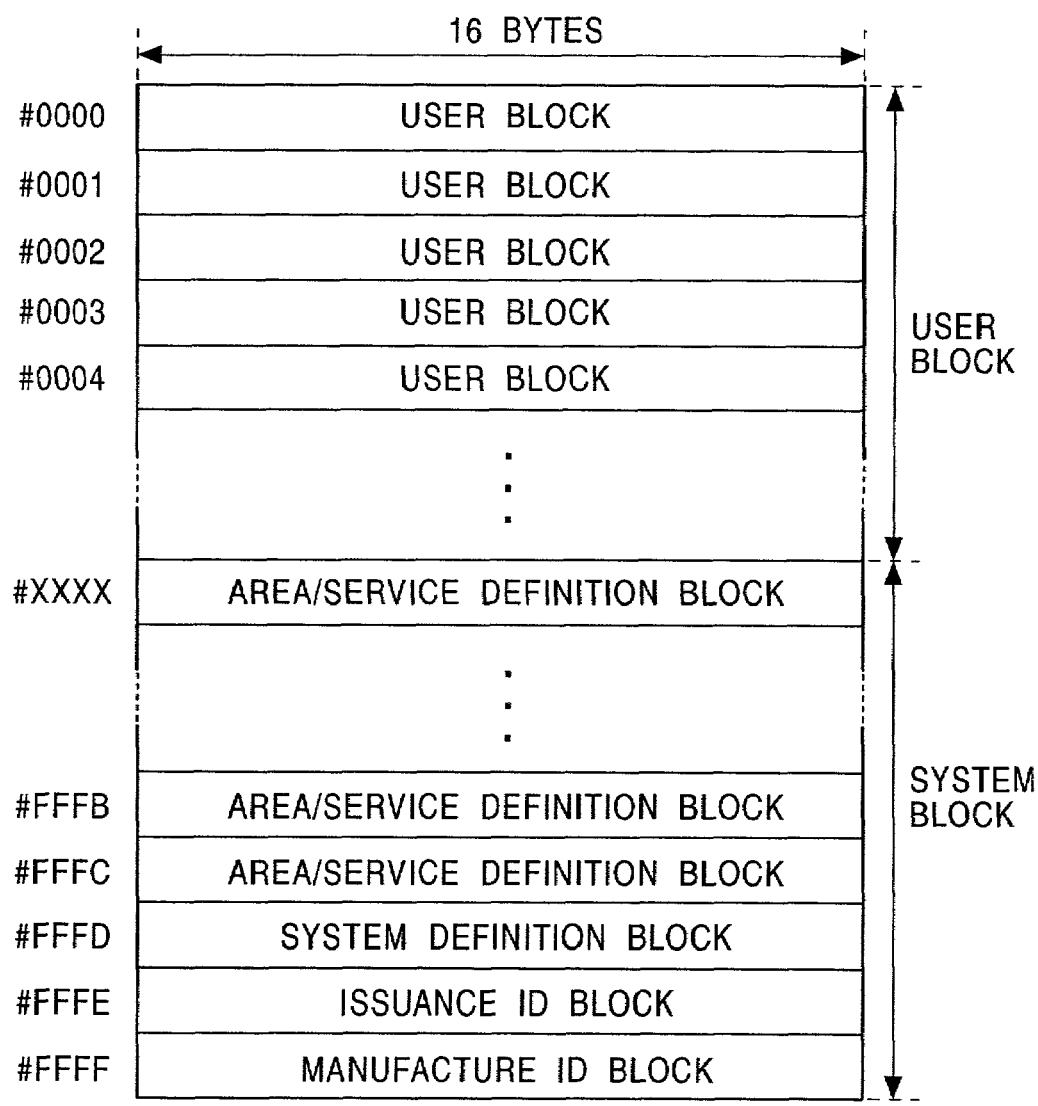
FIG. 6 is a diagram illustrating a logic format of an EEPROM shown in FIG. 5.

Referring now to FIG. 6, the logical format of the EEPROM 86 shown in FIG. 5 will be described.

The EEPROM 86 is constituted in units of blocks. For instance, in FIG. 6, one block includes 16 bytes.

In FIG. 6, logical addresses are given in an ascending order, the logical address of the uppermost block being #0000h ("h" denotes hexadecimal). The logical addresses shown in FIG. 6 range from #0000h to #FFFFh, so that 65536 (=$2^{16}$) blocks are included.

Each block is used as a user block or a system block. The blocks of the EEPROM 86 are allotted to the user blocks in the ascending order of the logical addresses, and to the system blocks in the descending order of the logical addresses. This means that, in FIG. 6, the number 15 of the user blocks increases downward, whereas the number of the system blocks increases upward. When available blocks run out, then no more user blocks or system blocks can be made. Thus, the boundary between the user blocks and the system blocks is not fixed, and there is no particular limit on the number of the user blocks or the number of the system blocks. In the case shown in FIG. 6, however, the total number of the user blocks and the system blocks is limited to 65536 or less.

There are five types of the system blocks, namely, manufacture ID (identification) blocks, issuance ID blocks, system definition block, area definition blocks, and service definition blocks. In the case shown in FIG. 6, the blocks indicated as the area definition blocks or the service definition blocks are indicated as area/service definition blocks.

Of the system blocks, the three blocks, namely, the manufacture ID blocks, the issued ID blocks, and the system definition blocks, will have basically already been disposed when the IC card 12 is issued, and are located at logical addresses #FFFFh, #FFFEh, and #FFFDh, respectively. The area/service definition blocks are disposed in a preparing order at logical address #FFFCh and above.

The information regarding the manufacture of the IC card 12 is disposed at the manufacture ID block. More specifically, the manufacture ID block carries, for example, a unique manufacture ID, a date of manufacture, or a manufacturer code.

The information regarding the issuance of the IC card 12 is disposed at the issued ID block. More specifically, the issued ID block carries, for example, the date when the IC card 12 was issued, and a code indicating the order of issuance of the IC cards 12, or a card ID.

The system definition block contains, for example, the number of the system blocks or user blocks that the EEPROM 86 has, or the keys distributed to the issuer 2, that has issued the IC card 12, from the acquirer/brand holder 1. The keys are used for mutual authentication among the IC card 12, the reader/writer 31, and the controller 32, as mentioned above.

The area definition block is prepared by assigning it as a storage area for the storage area of the EEPROM 86 to implement a variety of services, including the present service, and mainly contains the information for managing the storage area where they are disposed. More specifically, the area definition block contains, for example, a code range corresponding to the area for recording the information regarding the service, and the available capacity of each storage area.

The service definition block primarily contains information for managing a service area wherein applications for providing a variety of services to be discussed hereinafter are located, such information including the capacity of the service area and the keys required for implementing processing.

Figure 7:
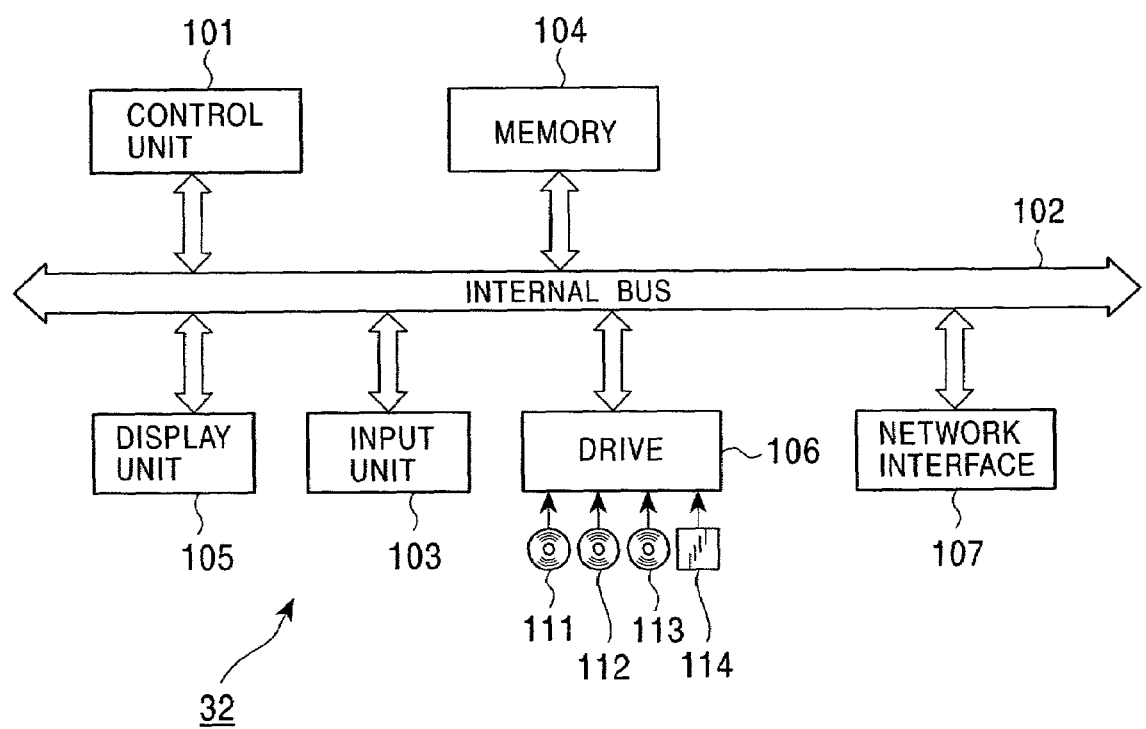
FIG. 7 is a block diagram showing the configuration of the controller shown in FIG. 3.

FIG. 7 is a block diagram showing the configuration of the controller 32.

A control unit 101 carries out various types of processing on the basis of signals corresponding to diverse commands entered using an input unit 103 through an internal bus 102. A memory 104 mainly stores programs used by the control unit 101, the parameters for operations, or parameters that are changed as necessary in running programs. The control unit 101 and the memory 104 are mutually connected by the internal bus 102.

The internal bus 102 is also connected to the input unit 103, a display unit 105, a drive 106, and a network interface 107. The input unit 103 is constructed by, for example, a keyboard, a mouse, or a bar code reader, and is operated for entering diverse commands or data or the like to the control unit 101. The display unit 105 is formed of, for example, a cathode ray tube (CRT) or the like, and displays a variety of types of information in terms of texts or images or the like. A magnetic disk 111, an optical disk 112, a magneto-optical disk 113, and a semiconductor memory 114 are loaded, as necessary, onto the drive 106 to exchange data.

The network interface 107 is connected to the reader/writer 31 through the intermediary of, for example, RS-485A, or connected to a local area network (LAN) by using a predetermined interface cable or the like, or a wide area network, such as the Internet 11, for example, through the intermediary of a telephone line (not shown).

Figure 8:
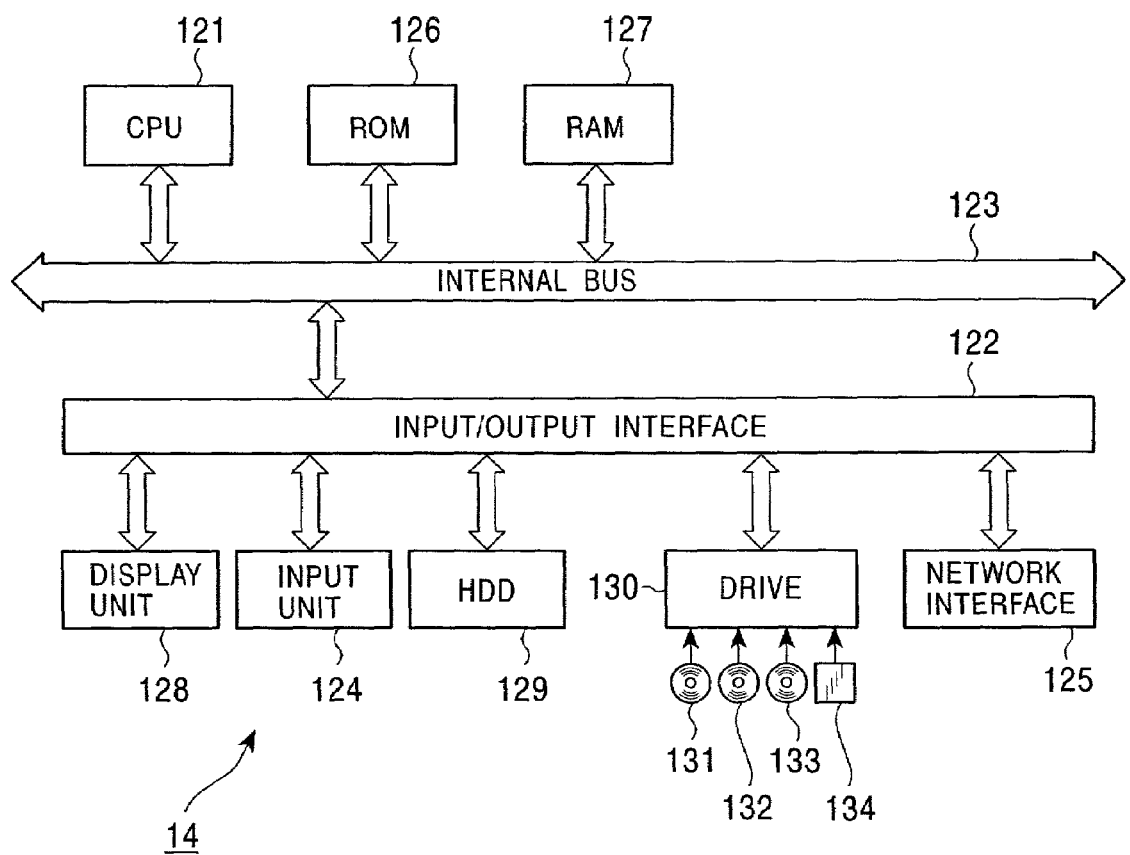
FIG. 8 is a block diagram showing the configuration of a personal computer shown in FIG. 2.

As explained in conjunction with FIG. 2, the user 3 is able to enjoy the service using the IC card 12, without going to a store, by connecting the reader/writer 15 to the personal computer 14. FIG. 8 is a block diagram showing the configuration of the personal computer 14.

Through the intermediary of an input/output interface 122 and an internal bus 123, a CPU 121 receives, for example, signals corresponding to diverse commands entered by the user 3 by using an input unit 124 and signals entered through the intermediary of a network interface 125, and performs various types of processing on the basis of the signals. A ROM 126 stores a program, such as a web browser for browsing web contents opened on the Internet 11, used by the CPU 121, and data basically fixed among the parameters for operations. A RAM 127 stores a program used for execution by the CPU 121 and parameters that are changed as necessary in the execution. The CPU 121, the ROM 126, and the RAM 127 are mutually connected by the internal bus 123.

The internal bus 123 is also connected to the input/output interface 122. The input unit 124 is constructed by, for example, a keyboard or a mouse, and is operated for entering diverse commands to the CPU 121. A display unit 128 is formed of, for example, a CRT or the like, and displays a variety of types of information in terms of texts or images or the like. A hard disk drive (HDD) 129 drives a hard disk to cause the programs used by the CPU 121 and data generated by processing implemented according to the programs to be recorded or reproduced. The magnetic disk 131, an optical disk 132, a magneto-optical disk 133, or a semiconductor memory 134 is loaded, as necessary, onto a drive 130 to exchange data. The network interface 125 is connected to the Internet 11 through the intermediary of a telephone line or the like (not shown), and also connected to the reader/writer 15 by using a predetermined connection cable to exchange information.

The POS center 17 and the MMK center 19 described in conjunction with FIG. 2 basically share the same configuration as that of the personal computer 14 shown in FIG. 8; therefore the descriptions thereof will be omitted.

Figure 9:
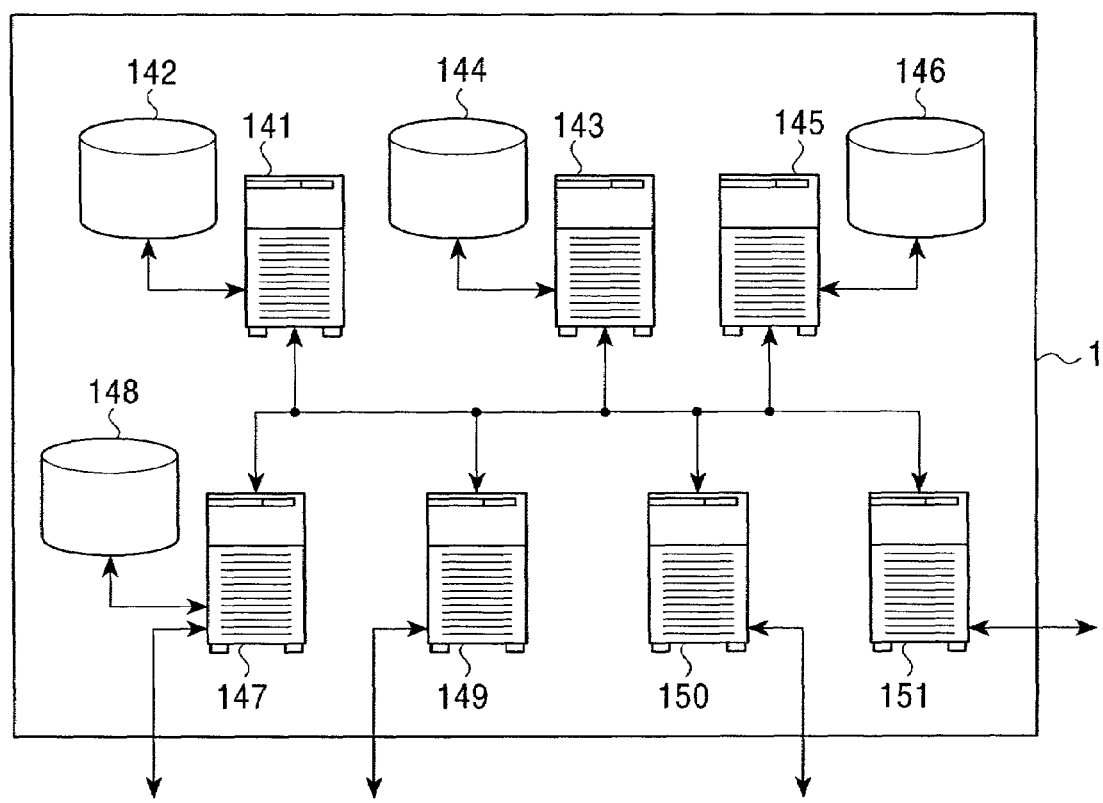
FIG. 9 is a block diagram showing the configuration of the acquirer/brand holder.

FIG. 9 is a block diagram showing the configuration of the acquirer/brand holder 1. The internal configurations of a merchant management server 141 through an issuer gateway (G/W) server 151 are basically the same as the personal computer 14 described in conjunction with FIG. 8; hence, the description thereof will be omitted.

The merchant management server 141 manages a merchant management database (DB) 142 for recording the information regarding the issuer 2 and the merchant 4 participating in the service. Recorded in the merchant management DB 142 are, for example, the names and addresses of the issuers 2 and the merchants 4 participating in the service or the account numbers of financial institutes used for settlement with associated issuers 2 or the merchants 4, the details of the agreement on the service, the key IDs for issued keys, etc.

A customer DB server 143 manages a customer DB 144 for recording the information regarding the user 3 using the service (i.e., the user of the service of an electronic money brand managed by the acquirer/brand holder 1). Recorded in the customer DB 144 are, for example, the names and addresses of customers, the information regarding the financial institutes that customers use for settlement, such as the account numbers of financial institutes or the card numbers of the credit cards that associated customers have, and the card IDs of the IC cards 12 owned by customers.

A security server 145 manages a key management DB 146 for recording the information regarding all keys used in the service and the information regarding the issuers 2 or the merchants 4 to which the individual keys are issued or distributed. As necessary, the security server 145 searches for keys to be issued to new participant issuers 2 or merchants 4, and output the keys to the issuer G/W server 151 or a merchant G/W server 149.

An accounting server 147 performs accounting on the basis of accounting information from affiliate merchants received from the merchant G/W server 149 or a web server 150, calculates a charge amount to the issuer 2, and outputs the calculated charge amount to the issuer 2 through the intermediary of the issuer G/W server 151. The accounting may be performed at a predetermined interval, e.g., one week or one month. The accounting server also performs the processing the service of proxy loading of electronic money into the IC card 12 issued by the issuer 2-1, which will be discussed hereinafter in conjunction with FIG. 14 and FIG. 16. The accounting server records the information regarding the proxy loading in a proxy loading DB 148, and performs settlement with the associated issuer 2-1 at a predetermined interval, e.g., one week or one month.

The merchant G/W server 149 is connected to the POS center 17, the MMK center 19, and the affiliate merchant terminal unit 21, which have been explained in conjunction with FIG. 2, to control the transfer of information to and from the POS center 17, the MMK center 19, and the affiliate merchant terminal unit 21. The merchant G/W server 149 outputs received data to an appropriate server among the merchant management server 141 through the accounting server 147. For example, if accounting information is received from the POS center 17, then the merchant G/W server 149 outputs the received data to the accounting server 147.

The web server 150 is connected to the Internet 11, controls the exchange of information with the cybershop 16 or the personal computer 14, and outputs received data to an associated server among the merchant management server 141 through the accounting server 147. For example, if the authentication information is received from the cybershop 16, then the web server 150 outputs the received data to the security server 145.

The issuer G/W server 151 is connected to the issuer 2 to control the transfer of information to and from the issuer 2, and outputs received data to an appropriate server among the merchant management server 141 through the accounting server 147. For example, if the issuer G/W server 151 receives a request from the issuer 2 for the issuance of a key associated to a new service, then the issuer G/W server 151 outputs the received data to the security server 145.

Figure 10:
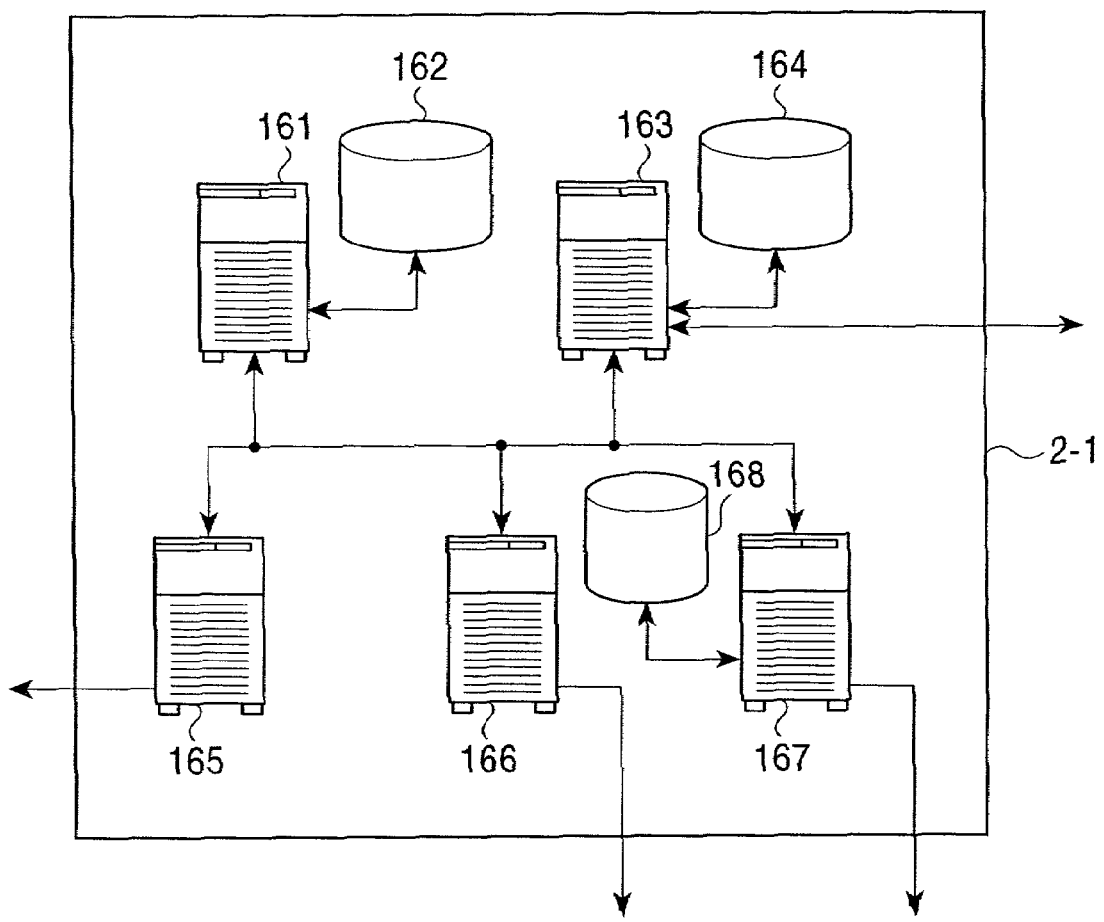
FIG. 10 is a block diagram showing the configuration of an issuer.

FIG. 10 is a block diagram showing the configuration of the issuer 2-1.

A security server 161 manages a key management DB 162 for saving keys issued from the acquirer/brand holder 1. When the IC card 12 is issued, the security server 161 finds and outputs a necessary key from the key management DB 162, and implements authentication processing by finding an associated key from the key management DB 162 on the basis of the authentication information regarding the IC card 12 that is received from the loading terminal unit 13 connected to the merchant G/W server 166, then outputs the authentication processing result to the merchant GIW server 166.

A user management server 163 manages a user DB 164 for recording information regarding the users 3 using the IC cards 12 that have been issued, and is connected mainly to a processing unit (not shown) for registering users or issuing IC cards. The user management server 163 receives, for example, the name and address of a customer, an account number of a financial institute or the card number of a credit card that the associated customer has, the information of the financial institute used by the customer for settlement, and the card ID of the IC card 12 owned by the customer from the processing unit (not shown) for registering users and issuing IC cards. The user management server 163 records such information in the user DB 164, and supplies the keys output from the security server 161 to the processing unit for registering users and issuing IC cards.

An acquirer/brand holder G/W server 165 is connected to the acquirer/brand holder 1 to control transfer of information, and outputs received data to an associated server among the security server 161 through an accounting server 167. For example, if the acquirer/brand holder G/W server 165 receives a key associated with a new service and issued from the acquirer/brand holder 1, then the acquirer/brand holder G/W server 165 outputs the received key to the security server 161.

The merchant G/W server 166 is connected to the loading terminal unit 13 or the MMK center 19, which has been explained in conjunction with FIG. 2, to control transfer of information to and from the loading terminal unit 13 or the MMK center 19, and outputs received data to an associated server among the security server 161 through the accounting server 167. For instance, if the merchant G/W server 166 receives information regarding the loading of electronic money into the IC card 12 from the loading terminal unit 13, then the merchant G/W server 166 outputs the received data to the accounting server 167. If the merchant G/W server 166 receives authentication information regarding the IC card 12 from the loading terminal unit 13, then merchant G/W server 166 outputs the received data to the security server 161.

The accounting server 167 performs accounting related to the loading of electronic money into the IC card 12 on the basis of the accounting information from the loading terminal unit 13 or the MMK center 19 that is entered from the merchant G/W server 166, and records the accounting result in the loading DB 168.

Figure 11:
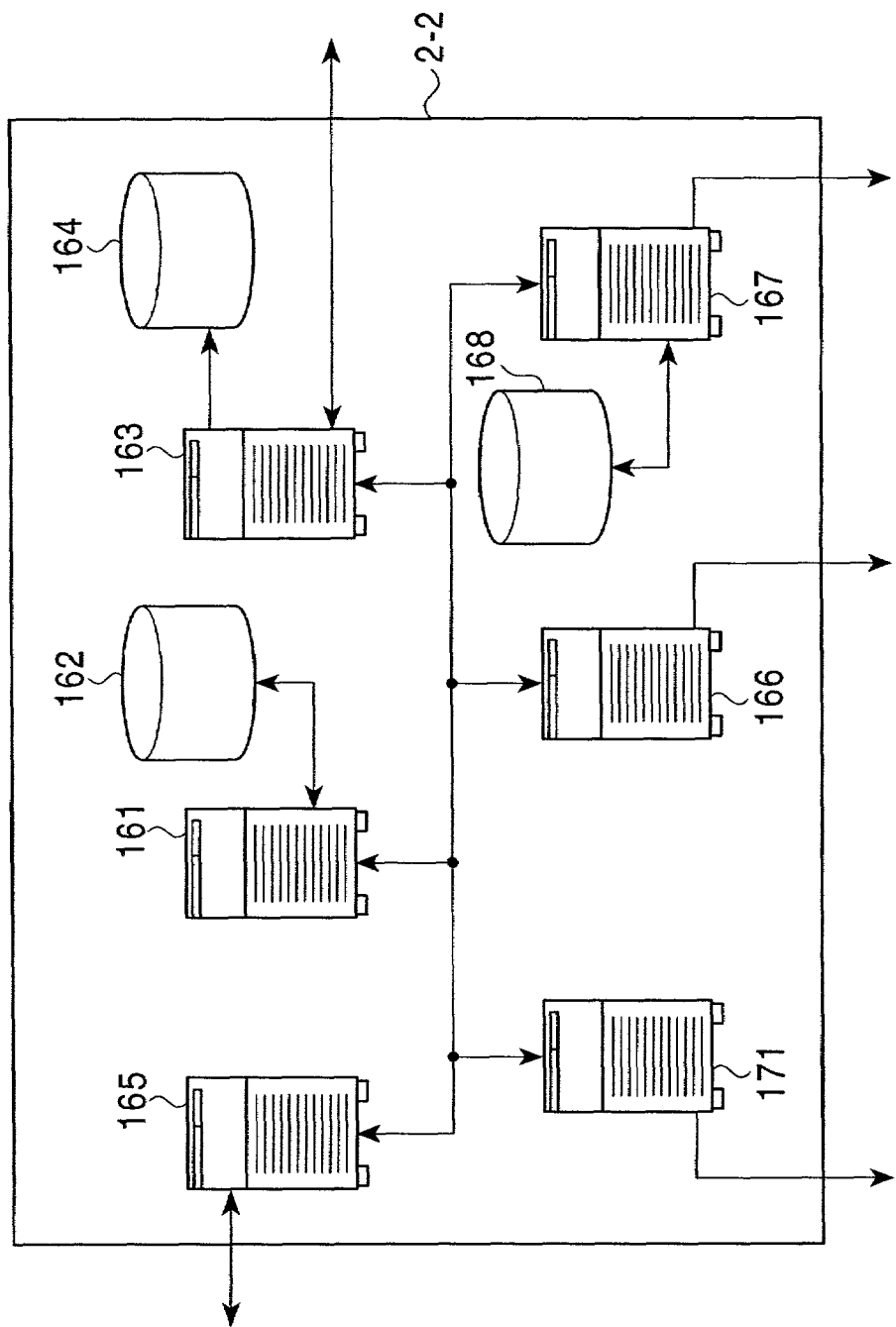
FIG. 11 is a block diagram showing the configuration of another issuer.

FIG. 11 is a block diagram showing the configuration of the issuer 2-2. The components corresponding to those of the issuer 2-1 shown in FIG. 10 are assigned the same reference numerals, and the descriptions thereof will be omitted as appropriate (the same applies hereinafter).

A web server 171 is connected to the Internet 11, and controls the transfer of information. The web server 171 outputs received data to an appropriate server among the security server 161 through the accounting server 167. For example, if the web server 171 receives authentication information regarding the IC card 12 from the personal computer 14, then the web server 171 outputs the received data to the security server 161.

An accounting server 167 performs accounting related to the loading of electronic money into the IC card 12 in response to an electronic money loading request from the personal computer 14 that is received from not only the merchant G/W server 166 but the web server 171 also, and records the accounting result in the loading DB 168.

Referring now to FIG. 12 through FIG. 16, the loading of electronic money into the IC card 12 and the dispositions of keys for implementing the loading of electronic money will be explained in detail.

Figure 12:
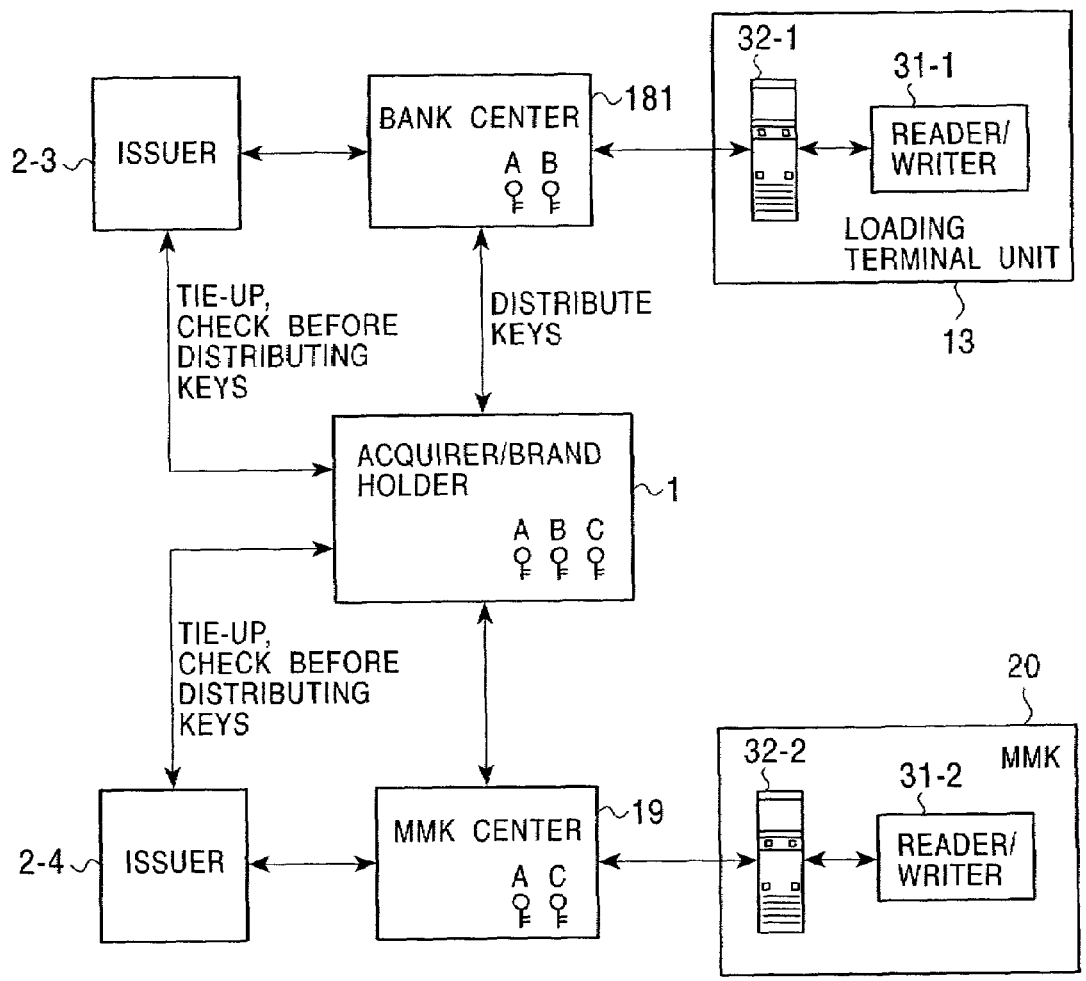
FIG. 12 is a diagram illustrating the dispositions of keys for loading electronic money at a loading terminal unit or MMK.

Referring to FIG. 12, the descriptions will be given of the dispositions of keys that enable the user 3 to accomplish the loading of electronic money into the IC card 12 by using the loading terminal unit 13 or the MMK 20 when the user 3 visits an actual store or the like.

It is assumed, for example, that the acquirer/brand holder 1 owns keys A through C for authorizing the execution of writing of data (i.e., the loading of electronic money) to the IC card 12. For example, the key A allows the loading of electronic money by the cashing service of a credit company A, the key B allows the loading of electronic money by withdrawal from an account of a bank B, and the key C allows the loading of electronic money by a credit card C.

It is further assumed that the key A and the key B are required to permit the cashing service of the credit company A and the loading of electronic money by the withdrawal from the account of the bank B at the loading terminal unit 13 managed by a bank center 181 on the basis of a contract between an issuer 2-3 and the bank center 181. In such a case, the acquirer/brand holder 1 checks with the issuer 2-3 whether the associated keys may be issued to the bank center 181, and issues and distributes the key A and the key B to the bank center 181 after obtaining a permission from the issuer 2-3.

The bank center 181 basically shares the same configuration as that of the personal computer 14 that has been explained in conjunction with FIG. 8; therefore, the descriptions thereof will be omitted.

Similarly, it is assumed that the key A and the key C are required to permit the cashing service of the credit company A and the loading of electronic money by the credit card C at an MMK 20 managed by the MMK center 19 on the basis of a contract between an issuer 2-4 and the MMK center 19. In such a case, the acquirer/brand holder 1 checks with the issuer 2-4 whether the associated keys may be issued to the MMK center 19, and issues and distributes the key A and the key C to the MMK center 19 after obtaining a permission from the issuer 2-4.

More specifically, if the key A and the key B have been recorded in the IC card 12 issued by the issuer 2-3, the user 3 of the IC card 12 can perform the loading of electronic money by the cashing service of the credit company A at the MMK 20, while the user 3 cannot perform the loading of electronic money by withdrawal from an account of the bank B. Similarly, if the key A and the key C have been recorded in the IC card 12 issued by the issuer 2-4, the user 3 of the IC card 12 can perform the loading of electronic money by the cashing service of the credit company A at the loading terminal unit 13 managed by the bank center 181, while the user 3 cannot perform the loading of electronic money by the credit card C.

The settlement method for commission charges or the like involved in such electronic money loading is similar to a conventional settlement processing. For instance, the settlement method may be individually established on the basis of the partnership agreement between the acquirer/brand holder 1 and the issuer 2-3, between the acquirer/brand holder 1 and the issuer 2-4, between the issuer 2-3 and the bank center 181, and between the issuer 2-4 and the MMK center 19. Alternatively, a supervisor of the service, namely, the supervisor of the acquirer/brand holder 1, may manage the settlement by the processing implemented by the accounting server 147 of the acquirer/brand holder 1.

FIG. 12 illustrates that the single loading terminal unit 13 is connected to the bank center 181, and the single MMK 20 is connected to the MMK center 19. However, a plurality of loading terminal units 13 and MMK's 20 can be connected to the bank center 181 and the MMK center 19. It is needless to say that a plurality of the bank centers 181 and the MMK centers 19 may participate in the service.

Referring to the flowchart shown in FIG. 13, the descriptions will be given of the loading of electronic money into the IC card 12 by using the loading terminal unit 13 or the MMK 20. In this case, the descriptions will be given of the loading of electronic money into the IC card 12 by using the loading terminal unit 13. Basically, the same processing will be implemented also in a case where the loading of electronic money into the IC card 12 is performed by using the MMK 20.

In step S1, the antenna 46 of the reader/writer 31 of the loading terminal unit 13 monitors the load thereof by radiating a predetermined electromagnetic wave to detect the IC card 12. The DPU 51 generates a signal indicating that the IC card 12 has been detected, and outputs the signal to the controller 32 through the bus 55 and the SCC 53.

In step S2, the control unit 101 of the controller 32 receives the signal which indicates that the IC card 12 has been detected and which has been transmitted from the reader/writer 31 through the intermediary of the network interface 107 and the internal bus 102. The control unit 101 then outputs, through the internal bus 102, the data associated with a menu screen that includes a message or the like for prompting the user 3 to perform the next operation to the display unit 105 so as to cause the display unit 105 to display the menu screen.

In step S3, the control unit 101 of the controller 32 receives, through the internal bus 102, a command (e.g., a command instructing the loading of electronic money worth 5000 yen) entered by the user 3 through the input unit 103, and outputs the command to the reader/writer 31 through the intermediary of the internal bus 102 and the network interface 107. The reader/writer 31 implements predetermined processing to transmit the received command to the IC card 12.

In step S4, the antenna 73 of the IC card 12 receives a modulated wave from the reader/writer 31, and the interface 81, the BPSK demodulator 82, and the operation part 84 perform predetermined processing. Then, authentication information that includes a key associated with the received command is read from the EEPROM 86. The read authentication information is subjected to predetermined processing in the operation part 84, the BPSK modulator 88, and the interface 81, then sent out to the reader/writer 31 through the antenna 73.

In step S5, the antenna 46 of the reader/writer 31 receives the authentication information transmitted from the IC card 12, and outputs the authentication information to the demodulating circuit 44. The authentication information that has been demodulated in the demodulating circuit 44 is subjected to predetermined processing, such as the BPSK modulation, in the SPU 52, then supplied to the DPU 51. The DPU 51 generates a signal requesting for authentication processing, and outputs the generated signal together with the received authentication information and the command indicating the instruction given by the user 3 that has been entered in step S3 to the controller 32 through the intermediary of the bus 55 and the SCC 53. The control unit 101 of the controller 32 receives the signal requesting for authentication processing, the command indicating the instruction of the user 3, and the authentication information through the intermediary of the network interface 107 and the internal bus 102, then transmits them to the associated bank center 181 through the intermediary of the internal bus 102 and the network interface 107.

In step S6, the CPU 121 of the bank center 181 (FIG. 8 shows the configuration of not only the personal computer 14 but also the configuration of the POS center 17, the MMK center 19, or the bank center 181) reads out a key, which has been supplied from the acquirer/brand holder 1 and saved at the RAM 127 or an HDD 129, and performs authentication processing on the basis of the request for authentication processing and the authentication information received through the intermediary of the network interface 125, the input/output interface 122, and the internal bus 123.

In step S7, the CPU 121 of the bank center 181 determines whether the authentication of the IC card 12 detected in step SI has been found valid in the authentication processing implemented in step S6. If the CPU 121 determines in step S7 that the IC card 12 has been found invalid, then the CPU 121 proceeds to step S16.

If it is determined in step S7 that the authentication of the IC card 12 has been found valid, then the CPU 121 of the bank center 181 verifies, in step S8, whether the loading of value according to a method specified by the user 3 (e.g., loading of electronic money worth 5000 yen by a predetermined credit card), that is, whether the processing for the addition to the balance of the electronic money recorded in the IC card 12, is acceptable or not on the basis of the received command. If, for example, the loading of value is performed by cash, then the CPU 121 of the bank center 181 checks with the loading terminal unit 13 whether the correct amount of cash has been loaded. If the loading of value is implemented by a credit card or the withdrawal from a bank account, then the CPU 121 inquires of the issuer 2 about the balance of the available amount of the credit card corresponding to the electronic money to be loaded, or whether there is a sufficient balance at a bank account. The issuer 2 inquires, for example, of a predetermined financial institute 5, such as a credit card company or a bank, about whether the associated user 3 is entitled to use the credit card for the amount corresponding to the value loading or withdrawal from his or her bank account.

In step S9, the CPU 121 of the bank center 181 determines whether the value loading is acceptable or not on the basis of the response signal to the inquiry that is received from the loading terminal unit 13 or the issuer 2 through the intermediary of the network interface 125, the input/output interface 122, and the internal bus 123. If it is determined in step S9 that the value loading is not acceptable, then the CPU 121 proceeds to step S16.

If it is determined in step S9 that the value loading is acceptable, then the control unit 101 of the controller 32 of the loading terminal unit 13 that has received the signal indicating that the value loading is acceptable transmits, in step SI 0, a signal indicating that the value loading is acceptable to the reader/writer 31 through the internal bus 102 and the network interface 103. The DPU 51 of the reader/writer 31 outputs a command for causing the value loading to be carried out (rewriting the value of electronic money recorded in the appropriate file of the IC card 12) to the SPU 52 through the bus 55 on the basis of the signal received through the intermediary of the SCC 53 and the bus 55. The SPU 52 performs predetermined processing, such as the BPSK modulation, for example, on the received command, then outputs the processed command to the modulating circuit 43. The modulating circuit 43 carries out the ASK modulation on a carrier wave of a predetermined frequency supplied from the oscillator 45 on the basis of the data supplied from the SPU 52, and outputs the generated modulated wave to the IC card 12 in the form of an electromagnetic wave through the antenna 46.

In step S11, the antenna 73 of the IC card 12 receives the modulated wave from the antenna 46 of the reader/writer 31. The received modulated wave is detected by the interface 81 and subjected to the ASK demodulation and the BPSK demodulation in the BPSK demodulator 82, then decoded in the encoder/decoder 96 of the operation part 84. Thus, the data recorded in the EEPROM 86 is rewritten by the sequencer 95 to carry out the value loading, and the result is saved.

In step S12, the control unit 101 of the controller 32 of the loading terminal unit 13 notifies the bank center 181 of the processing result through the intermediary of the internal bus 102 and the network interface 107.

In step S13, the CPU 121 of the bank center 181 receives the value loading result from the loading terminal unit 13 through the intermediary of the network interface 125, the input/output interface 122, and the internal bus 123, then notifies the issuer 2 of the processing result through the intermediary of the internal bus 123, the input/output interface 122, and the network interface 125. The issuer 2 records the received processing result in the loading DB 168 by means of the processing of the accounting server 167, and notifies the acquirer/brand holder 1 of the processing result, as necessary. The notification of value loading results may be performed sequentially each time the processing is carried out, or at a predetermined interval of, for example, one week or one month.

In step S14, the control unit 101 of the controller 32 of the loading terminal unit 13 generates a control signal for recording the log of value loading result in the IC card 12, and transmits the generated control signal to the reader/writer 31 through the intermediary of the internal bus 102 and the network interface 107. The DPU 51 of the reader/writer 31 outputs a command to be transmitted to the IC card 12 to the SPU 52 through the bus 55 on the basis of the signal received through the intermediary of the SCC 53 and the bus 55. The command that has been subjected to predetermined processing in the SPU 52 and the modulating circuit 43 is output as an electromagnetic wave to the IC card 12 through the antenna 46.

In step S15, the antenna 73 of the IC card 12 receives the modulated wave from the reader/writer 31. The modulated wave undergoes predetermined processing in the interface 81, the BPSK demodulator 82, and the operation part 84. The log is written to the EEPROM 86 thereby to save it.

If it is determined in step S7 that the authentication of the IC card 12 is invalid, or if it is determined in step S9 that the value loading is not acceptable, then the CPU 121 of the bank center 181 outputs an error message to the loading terminal unit 13 through the intermediary of the internal bus 123, the input/output interface 122, and the network interface 125 in step S161.

In step S17, the control unit 101 of the controller 32 of the loading terminal unit 13 outputs the received error message to the display unit 105 through the internal bus 102 to cause the display unit 105 to display the error message.

Figure 14:
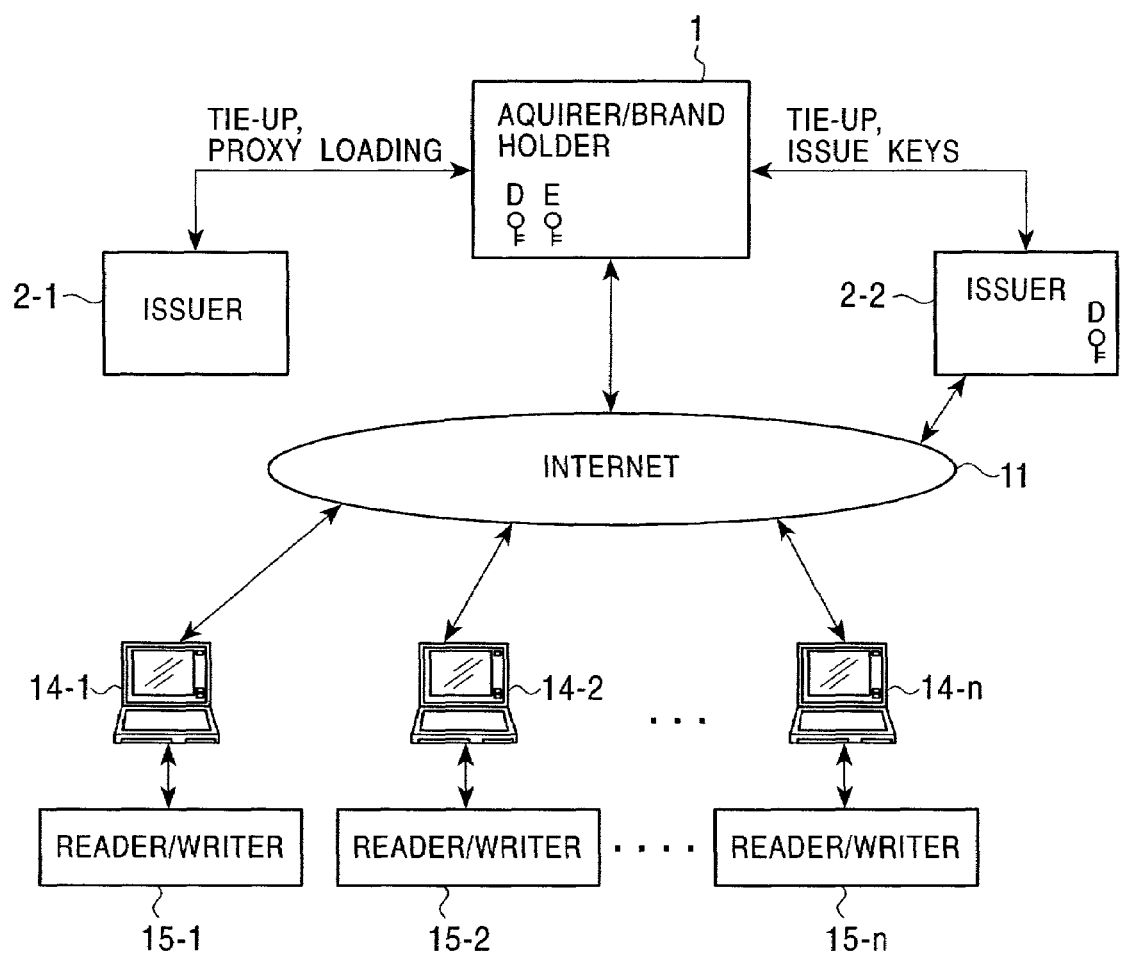
FIG. 14 is a diagram illustrating the dispositions of keys for loading electronic money over the Internet.

Referring now to FIG. 14, the descriptions will be given of the dispositions of the keys and the authentication processing that enable the user 3 to implement the loading of electronic money into the IC card 12 over the Internet 11, without the need for visiting an actual store or the like.

It is assumed that the acquirer/brand holder 1 owns a key D and a key E to, for example, authenticate the execution of writing data to the IC card 12, i.e., the loading of electronic money. It is further assumed that, for example, the key D permits the loading of electronic money by the cashing service of a credit company D, and the key E permits the loading of electronic money by withdrawal from an account of a bank E.

It is also assumed that the key D is necessary for the user 3, who has the IC card 12 issued by the issuer 2-2, to be able to perform the loading of electronic money over the Internet 11 by using the cashing service of the credit company D by operating one of personal computers 14-1 to 14-n. In such a case, the acquirer/brand holder 1 issues and distributes the key D to the issuer 2-2. The issuer 2-2 is connected to the Internet 11 to perform authentication processing on the basis of the authentication information of the IC card 12 owned by the user 3 that is received through the intermediary of the reader/writer 15, the personal computer 14, and the Internet 11, and the key D supplied from the acquirer/brand holder 1. If the authentication processing result indicates that the authentication is valid, then the loading of electronic money is executed.

Similarly, it is assumed that the key E is necessary for the user 3, who has the IC card 12 issued by the issuer 2-1, to be able to perform the loading of electronic money over the Internet 11 by withdrawal from an account of the bank E by operating one of the personal computers 14-1 to 14-n. In such a case, the acquirer/brand holder 1 issues and distributes the key E to the issuer 2-1. The issuer 2-1, however, is not connected to the Internet 11, so that it asks the acquirer/brand holder 1 to perform proxy loading. The acquirer/brand holder 1 records the key E, which has been issued to the issuer 2-1, in the key management DB 146 as the key for the proxy loading.

The acquirer/brand holder 1 performs authentication processing on the basis of the authentication information of the IC card 12 owned by the user 3 that is received through the intermediary of the reader/writer 15, the personal computer 14, and the Internet 11, and the information regarding the key E recorded in the key management DB 146. If the authentication processing result indicates that the authentication is valid, then the loading of electronic money is executed by the processing carried out by the accounting server 147, and the result is recorded in the proxy loading DB 148.

In this case also, the settlement method for commission charges or the like involved in such electronic money loading is similar to a conventional settlement processing. For instance, the settlement method may be individually established on the basis of the partnership agreement between the acquirer/brand holder 1 and the issuer 2-1, and between the acquirer/brand holder 1 and the issuer 2-2. Alternatively, a supervisor of the service, namely, the supervisor of the acquirer/brand holder 1, may manage the settlement by the processing implemented by the accounting server 147 of the acquirer/brand holder 1.

Referring now to the flowchart shown in FIG. 15, the descriptions will be given of the loading of electronic money into the IC card 12 performed by the issuer 2-2 over the Internet In step S21, in response to a signal indicating the operation of the user 3 that is received from the input unit 124 through the intermediary of the input/output interface 122 and the internal bus 123, the CPU 121 of the personal computer 14 loads the web browser software stored in the HDD 129 into the RAM 127 and activates it thereby to start up the web browser. In step S22, the CPU 121 connects to the issuer 2-2 over the Internet 11.

In step S23, the web server 171 of the issuer 2-2 outputs data associated with a loading request screen to the personal computer 14 over the Internet 11.

In step S24, the CPU 121 of the personal computer 14 outputs the data associated with the loading request screen, which has been received through the intermediary of the network interface 125, the input/output interface 122, and the internal bus 123, to a display unit 182 through the intermediary of the internal bus 123 and the input/output interface 122, and cause the display unit 182 to display the loading request screen. The loading request screen primarily shows a message prompting the user to set the IC card 12 at a predetermined reading position to allow the reader/writer 15 and the IC card 12 to communicate with each other, and a menu prompting an input operation. In this case, it is assumed that the loading of value into the IC card 12 has been selected and instructed by the user 3 by using the input unit 124.

In step S25, the antenna 46 of the reader/writer 15 monitors the load thereof by radiating a predetermined electromagnetic wave to detect the IC card 12. The DPU 51 generates a signal indicating that the IC card 12 has been detected, and outputs the signal to the personal computer 14 through the bus 55 and the SCC 53.

In step S26, the SCC 53 of the reader/writer 15 receives the command entered by the user 3 through the personal computer 14, then outputs the command to the SPU 52 through the bus 55. The command is subjected to predetermined processing in the SPU 52 and the modulating circuit 43, and transmitted to the IC card 12 through the antenna 46.

Figure 13:
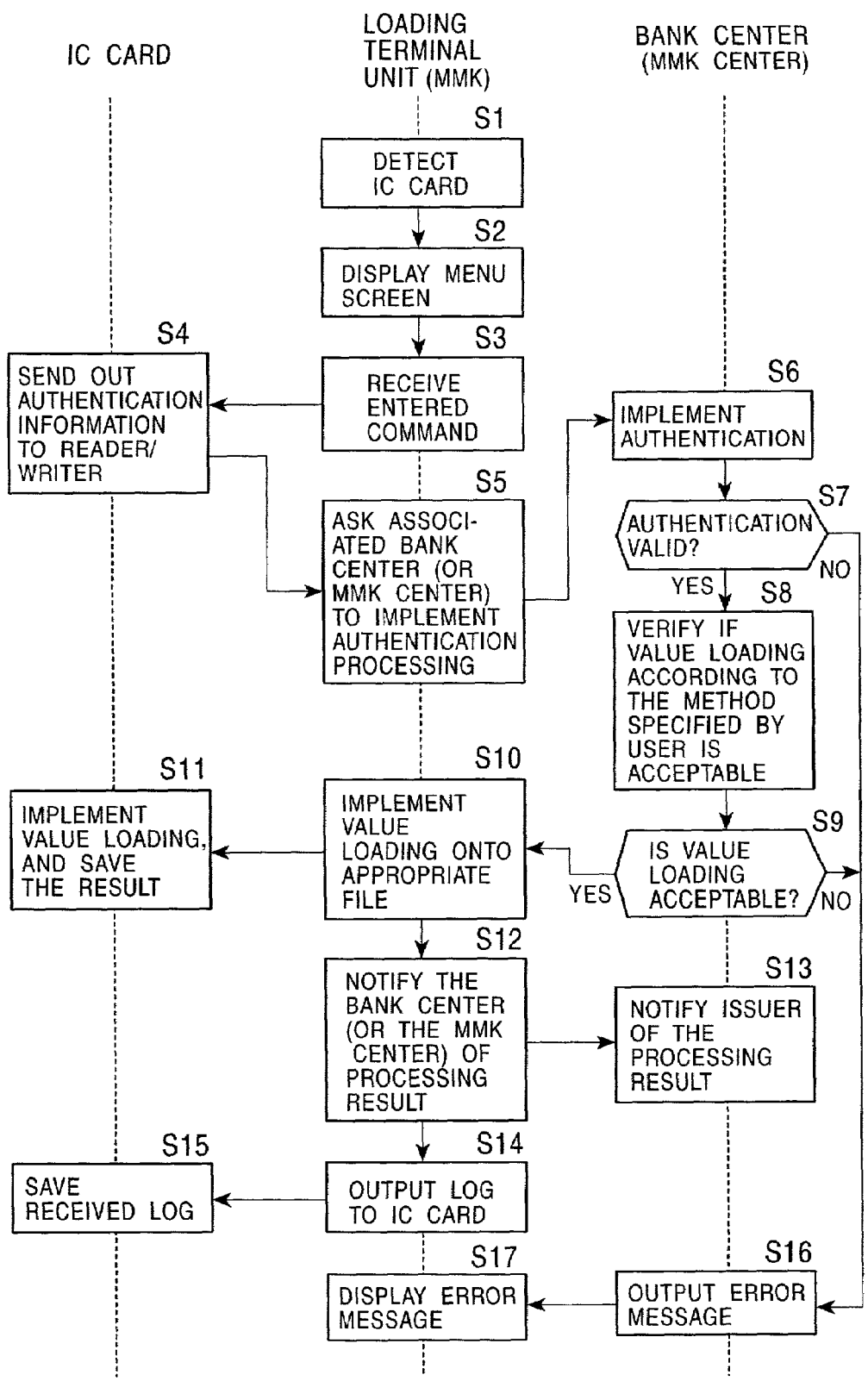
FIG. 13 is a flowchart illustrating the processing of loading electronic money at a loading terminal unit or MMK.

In step S27, the same processing as that in step S4 shown in FIG. 13 is carried out.

In step S28, the antenna 46 of the reader/writer 15 receives the authentication information transmitted from the IC card 12 and outputs the authentication information to the demodulating circuit 44. The data that has been demodulated by the demodulating circuit 44 is subjected to predetermined processing, such as the BPSK modulation, in the SPU 52, and supplied to the DPU 51. The DPU 51 generates a signal for requesting authentication processing, and transmits the generated signal to the personal computer 14 together with the received authentication information through the intermediary of the bus 55 and the SCC 53.

In step S29, the CPU 121 of the personal computer 14 receives the authentication processing request and the authentication information through the intermediary of the network interface 125, the input/output interface 122, and the internal bus 123, and transmits the authentication processing request and the authentication information to the issuer 2-2 over the Internet 11 together with the command associated with the operation performed by the user 3 (the command instructing the loading of value into the IC card 12 in this case).

In step S30, the web server 171 of the issuer 2-2 receives the authentication processing request and the authentication information, and outputs the request and the information to the security server 161. The security server 161 carries out authentication processing on the basis of the received authentication processing request and the authentication information by referring to the key that has been supplied from the acquirer/brand holder 1 and stored in the key management DB 162.

In step S31, the security server 161 determines whether the authentication of the IC card 12, which was detected in step S25, has been proven valid in the authentication processing implemented in step S30. If it is determined in step S31 that the authentication of the IC card 12 is invalid, then the processing proceeds to step S41.

If it is determined in step S31 that the authentication of the IC card 12 is valid, then the accounting server 167 inquires, in step S32, a predetermined financial institute 5 (a credit company, a bank, etc.) about whether the loading of value according to the method specified by the user 3 (e.g., the loading of electronic money worth 5000 yen by a predetermined credit card) is acceptable (e.g., whether there is a balance of amount that allows the use of a credit for the loading of electronic money) on the basis of the received command for the purpose of verification.

In step S32, the accounting server 167 determines whether the loading of value is acceptable on the basis of a response signal to the inquiry sent from the financial institute 5. If it is determined in step S32 that the loading of value is not acceptable, then the processing proceeds to step S41.

If it is determined in step S33 that the loading of value is acceptable, the DPU 51 of the reader/writer 15 that has received a signal indicating that the loading of value is acceptable from the issuer 2-2 through the intermediary of the Internet 11 and the personal computer 14 generates, in step S34, a command for executing the loading of electronic money that is to be transmitted to the IC card 12 on the basis of the received signal, and outputs the command to the SPU 52 through the bus 55. Then, the SPU 52 and the modulating circuit 43 carry out predetermined processing to generate a modulated wave corresponding to the command, and the modulated wave is output as an electromagnetic wave to the IC card 12 through the antenna 46.

In step S35, the antenna 73 of the IC card 12 receives the modulated wave from the antenna 46 of the reader/writer 15. The modulated wave is then subjected to predetermined processing in the interface 81, the BPSK demodulator 82, and the operation part 84. Based on the command, the data recorded in the EEPROM 86 is rewritten, that is, the value loading is implemented, and the result is saved.

In step S36, the DPU 51 of the reader/writer 15 notifies the issuer 2-2 of the processing result through the intermediary of the bus 55, the SCC 53, the personal computer 14, and the Internet 11.

In step S37, the web server 171 of the issuer 2-2 receives the value loading result from the reader/writer 15, and supplies the result to the accounting server 167. The accounting server 167 records the received result of the value loading in the loading DB 168.

In step S38, the acquirer/brand holder G/W server 165 notifies the acquirer/brand holder 1 of the result of the value loading. The notification of value loading results may be performed sequentially each time the loading is implemented, or at a predetermined interval of, for example, one week or one month.

In step S39, the DPU 51 of the reader/writer 15 generates a command for recording the log of a value loading result in the IC card 12 on the basis of the signal received through the intermediary of the SCC 53 and the bus 55, and outputs the generated command to the SPU 52 through the bus 55. The command that has been subjected to predetermined processing in the SPU 52 and the modulating circuit 43 is output in the form of an electromagnetic wave to the IC card 12 through the antenna 46.

In step S40, the same processing as that of step S15 shown in FIG. 13 is performed.

If it is determined that the authentication of the IC card 12 is invalid in step S31, or if the value loading is not acceptable in step S33, then the web server 171 of the issuer 2-2 outputs an error message to the personal computer 14 over the Internet 11 in step S41.

In step S42, the CPU 121 of the personal computer 14 receives the error message through the intermediary of the network interface 125, the input/output interface 122, and the internal bus 123, and outputs the received error message to the display unit 128 through the intermediary of the internal bus 123 and the input/output interface 122 so as to cause the display unit 128 to display the error message.

Figure 16:
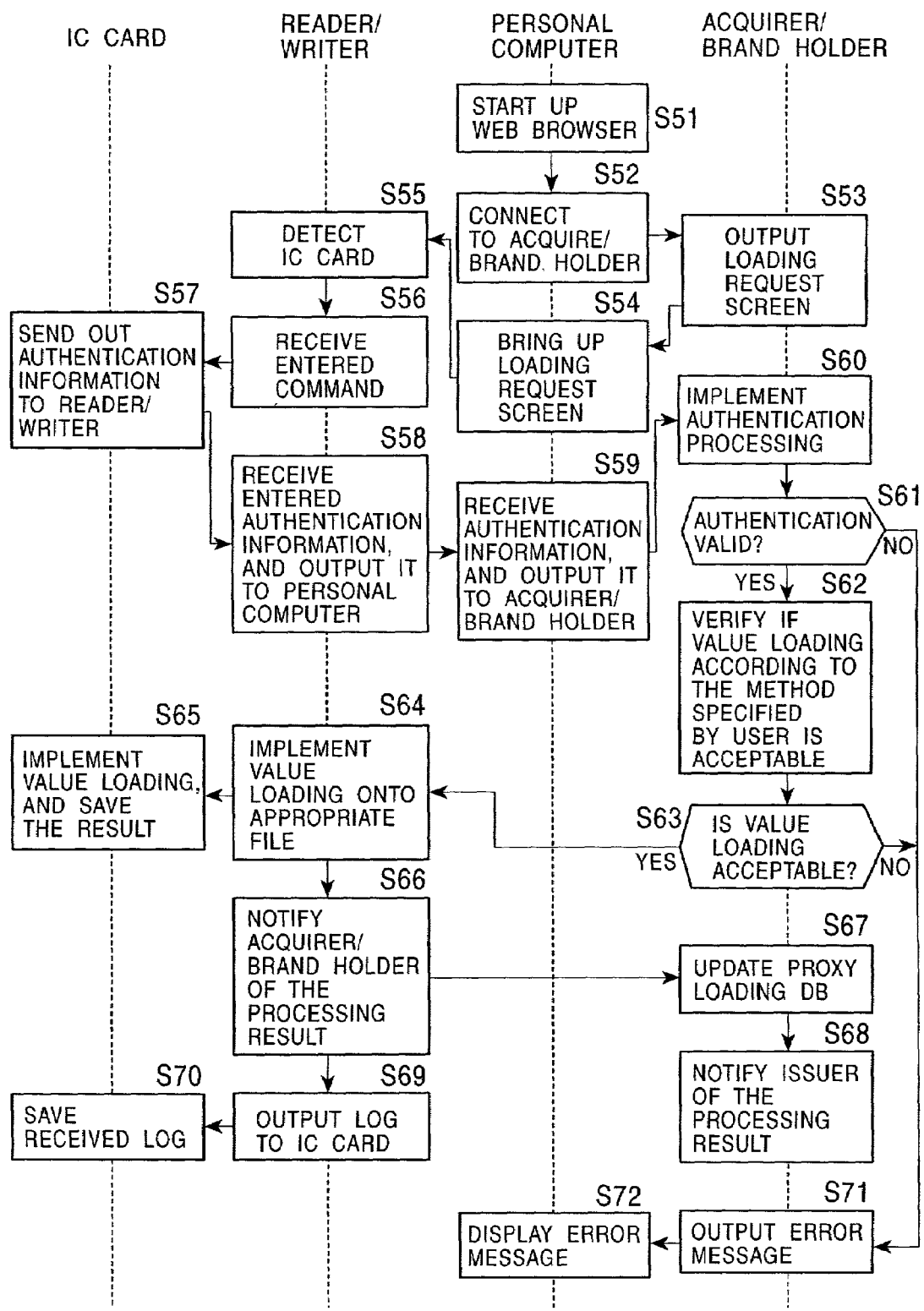
FIG. 16 is a flowchart illustrating the processing carried out when an acquirer/brand holder acts as a proxy for loading electronic money over the Internet.

Referring now to the flowchart shown in FIG. 16, the descriptions will be given of the loading of electronic money into the IC card 12 by the proxy loading performed by the acquirer/brand holder 1.

Figure 15:
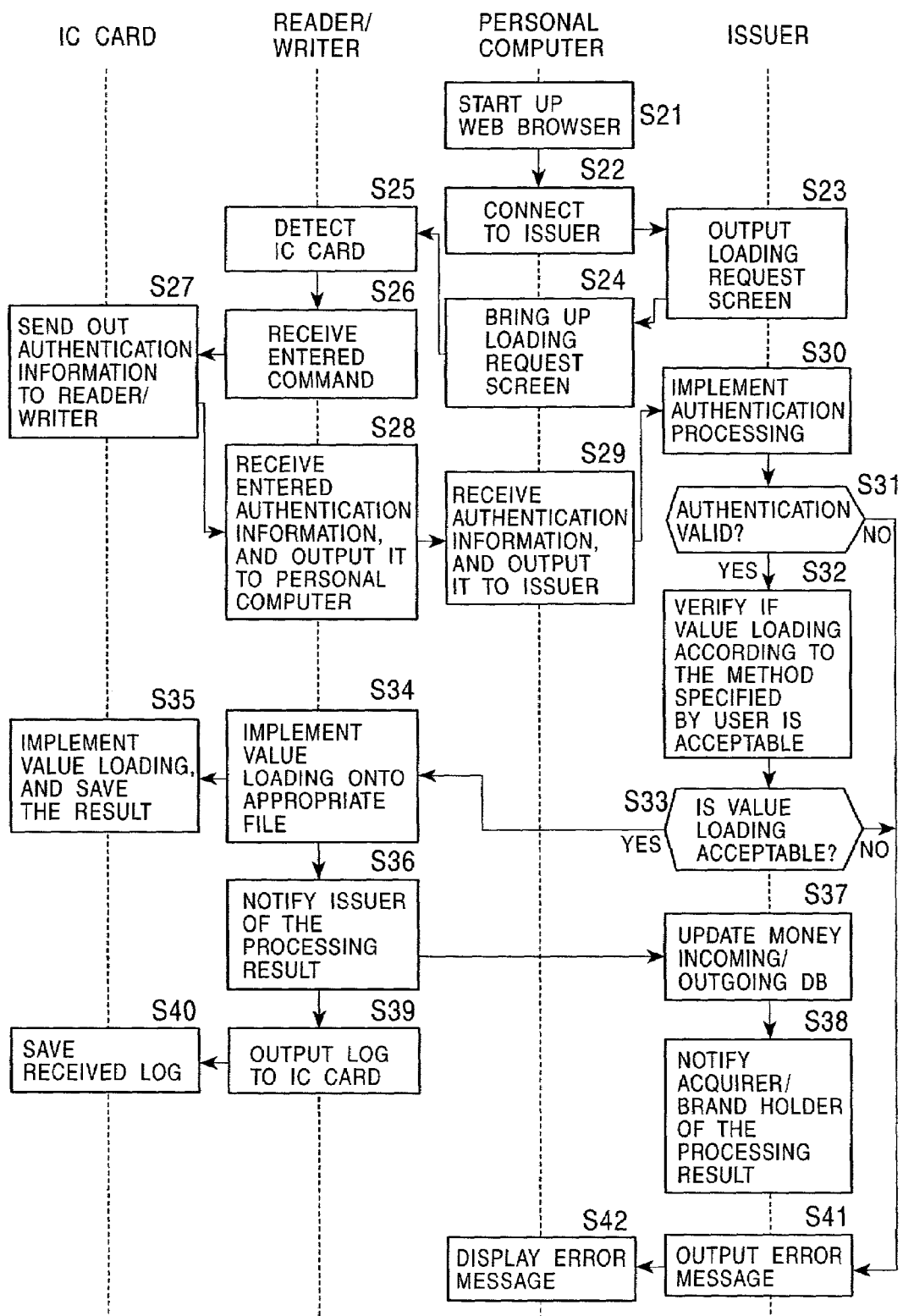
FIG. 15 is a flowchart illustrating the processing of loading electronic money over the Internet.

In step S51, the same processing as that of step S21 shown in FIG. 15 is carried out.

In step S52, the CPU 121 of the personal computer 14 connects to the acquirer/brand holder 1 over the Internet 11.

In step S53, the web server 150 of the acquirer/brand holder 1 outputs data associated with a loading request screen to the personal computer 14 over the Internet 11.

In step S54 through step S58, the same processing as that of step S24 through S28 shown in FIG. 15 is implemented.

In step S59, the CPU 121 of the personal computer 14 receives an authentication processing request and the authentication information through the intermediary of the network interface 125, the input/output interface 122, and the internal bus 123, and transmits the authentication processing request and the authentication information to the acquirer/brand holder 1 over the Internet 11 together with a command associated with an operation performed by the user 3 (the command instructing the loading of value into the IC card 12 in this case).

In step S60, the web server 150 of the acquirer/brand holder 1 receives the authentication processing request and the authentication information, and outputs the request and the information to the security server 145. The security server 145 carries out authentication processing on the basis of the received authentication processing request and the authentication information by reading out the key that has been stored in the key management DB 146.

In step S61, the security server 145 determines whether the authentication of the IC card 12, which was detected in step S55, has been proven valid in the authentication processing carried out in step S60. If it is determined in step S61 that the authentication of the IC card 12 is invalid, then the processing proceeds to step S71.

If it is determined in step S61 that the authentication of the IC card 12 is valid, then the accounting server 145 inquires, in step S62, an associated issuer 2-1 about whether the loading of value according to the method specified by the user 3 (e.g., the loading of electronic money worth 5000 yen by a predetermined credit card) is acceptable (e.g., whether there is a balance of amount that allows the use of a credit for the loading of electronic money) on the basis of the received command for the purpose of verification.

In step S63, the accounting server 147 determines whether the loading of value is acceptable on the basis of a response signal to the inquiry sent from the issuer 2-1. If it is determined in step S63 that the loading of value is not acceptable, then the processing proceeds to step S71.

If it is determined in step S63 that the loading of value is acceptable, then the DPU 51 of the reader/writer 15 that has received a signal indicating that the loading of value is acceptable from the acquirer/brand holder 1 through the intermediary of the SCC 53 and the bus 55 carries out the same processing as that of step S34 shown in FIG. 15.

In step S65, the same processing as that of step S35 shown in FIG. 15 is carried out.

In step S66, the DPU 51 of the reader/writer 15 notifies the acquirer/brand holder 1 of the processing result through the intermediary of the bus 55, the SCC 53, the personal computer 14, and the Internet 11.

In step S67, the web server 150 of the acquirer/brand holder 1 receives the value loading result from the reader/writer 15, and supplies the result to the accounting server 147. The accounting server 147 records the received result of the value loading in the proxy loading DB 148.

In step S68, the issuer G/W server 151 notifies the issuer 2-1 of the result of the value loading. The notification of value loading results may be performed sequentially each time the loading is implemented, or at a predetermined interval of, for example, one week or one month.

In step S69 and step S70, the same processing as that in step S39 and step S40 shown in FIG. 15 is performed.

If it is determined that the authentication of the IC card 12 is invalid in step S61, or if the value loading is not acceptable in step S63, then the web server 150 of the acquirer/brand holder 1 outputs an error message to the personal computer 14 over the Internet 11 in step S71.

In step S72, the same processing as that of step S42 shown in FIG. 15 is carried out.

Referring now to FIG. 17 through FIG. 21, detailed descriptions will be given of the processing for the user 3 to purchase goods by using electronic money loaded in the IC card 12 or to use a variety of services, and the dispositions of keys for carrying out the processing.

First, referring to FIG. 17, the descriptions will be given of the dispositions of the keys that allow the user 3 to visit an actual store or the like to purchase goods or services by using the electronic money loaded into the IC card 12 by employing the affiliate merchant terminal unit 18.

As described above in conjunction with FIG. 2, when the merchant 4 that does not have an organization for general management independently participates in the service, the acquirer/brand holder 1 issues and distributes appropriate keys on the basis of a participation agreement to the affiliate merchant terminal unit 18 installed at each merchant 4. In other words, the affiliate merchant terminal units 18-1 -1 through 18-1-n shown in FIG. 17 store keys for services, which can be provided at the individual merchants 4, in readers/writers 31-3-1 through 31-3-n; therefore, authentication processing can be performed between the affiliate merchant terminal units 18 and the IC cards 12.

The merchant 4 selects a service in line with the business thereof, concludes a tie-up for the service, and receives an associated key supplied from the acquirer/brand holder 1, thereby enabling the merchant 4 to provide the selected service to the user 3. More specifically, the user 3 having the IC card 12 in which a key F or a key J has been stored can use a service that can be supplied by the key F or the key J at a merchant equipped with the affiliate merchant terminal unit 18-1-1. The user 3 having the IC card 12 in which a key G has been stored can use a service that can be supplied by the key G at a merchant equipped with an affiliate merchant terminal unit 18-1-2. The user 3 having the IC card 12 in which the key G, a key H, or the key J has been stored can use a service that can be supplied by the key G, the key H, or the key J at a merchant equipped with the affiliate merchant terminal unit 18-1-n.

For instance, if a corporation having a plurality of merchants 4, such as chain store merchants, provides the service, then the acquirer/brand holder 1 issues and distributes keys to the POS center 17 that has control over the plurality of the merchants 4. Affiliate merchant terminal units 18-2-1 through 18-2-m basically connect to the POS center 17 to carry out the authentication processing with the IC card 12 without receiving keys. Alternatively, if the affiliate merchant terminal units 18-2-1 through 18-2-m employ an advanced tamperproof technology, then the keys may be stored in the affiliate merchant terminal units 18-2-1 through 18-2-m, respectively, so as to implement the authentication processing between each of the affiliate merchant terminal units 18-2-1 through 18-2-m and the IC card 12.

In other words, the user 3 having the IC card 12 in which the key F or the key H has been stored can use a service that can be supplied by the key F or the key H saved at the POS center 17 at the affiliate merchant terminal units 18-2-1 through 18-2-m, whereas the key F and the key H are not saved at reader/writers 31-4-1 through 31-4-m.

In the following descriptions, unless it is necessary to individually distinguish among the affiliate merchant terminal units 18-1-1 through 18-1-n, the affiliate merchant terminal units will be generically referred to simply as the affiliate merchant terminal unit 18-1. Similarly, unless it is necessary to individually distinguish among the affiliate merchant terminal units 182-1 through 18-2-m, the affiliate merchant terminal units will be generically referred to simply as the affiliate merchant terminal unit 18-2.

Referring to the flowchart shown in FIG. 18, the descriptions will be given of the processing performed when the user 3 having the IC card 12 purchases goods or a service by using the affiliate merchant terminal unit 18-1.

In step S81, the antenna 46 of the reader/writer 31 of the affiliate merchant terminal unit 18-1 monitors the load thereof by radiating a predetermined electromagnetic wave so as to detect the IC card 12. The DPU 51 generates a signal indicating that the IC card 12 has been detected, and outputs the signal to the controller 32 through the intermediary of the bus 55 and the SCC 53.

In step S82, the control unit 101 of the controller 32 receives the signal transmitted from the reader/writer 31 through the intermediary of the network interface 107 and the internal bus 102. The control unit 101 then outputs, through the internal bus 102, the data associated with a menu screen that includes a message or the like for prompting the user 3 to perform the next operation to the display unit 105 so as to cause the display unit 105 to display the menu screen.

In step S83, the control unit 101 of the controller 32 receives a command (e.g., a command indicating the use of electronic money worth 2000 yen) from the input unit 103 through the internal bus 102, and outputs the command to the reader/writer 31 through the intermediary of the internal bus 102 and the network interface 107. The reader/writer 31 implements predetermined processing to transmit the received command to the IC card 12.

In step S84, the same processing as that of step S4 shown in FIG. 13 is performed.

In step S85, the antenna 46 of the reader/writer 31 receives the authentication information transmitted from the IC card 12, and outputs the authentication information to the demodulating circuit 44. The data that has been demodulated in the demodulating circuit 44 is subjected to predetermined processing, such as the BPSK modulation, in the SPU 52, and supplied to the DPU 51. Through the bus 55, the DPU 51 reads out a key from the flash memory 42 on the basis of the received authentication information, and carries out the authentication processing.

In step S86, the DPU 51 of the reader/writer 31 determines whether the authentication of the IC card 12, which has been detected in step S81, is valid. In step S86, if the DPU 51 determines that the authentication of the IC card 12 is invalid, then the processing proceeds to step S94.

If it is determined in step S86 that the authentication of the IC card 12 is valid, then the DPU 51 of the reader/writer 31 verifies whether the processing for the use of the IC card specified by the user 3 is acceptable on the basis of a received command primarily by reading out necessary information from the IC card 12. For example, if a command instructing the purchase of a commercial product worth 2,000 yen is received, the DPU 51 of the reader/writer 31 generates a command for checking if the IC card 12 has electronic money sufficient for covering the payment of the commercial product, implements predetermined processing, and transmits the generated command to the IC card 12.

In step S88, the DPU 51 of the reader/writer 31 determines whether the processing of the command is acceptable mainly on the basis of a response signal to an inquiry that is received from the IC card 12 through the antenna 46. If it is determined, in step S88, that the processing of the command is not acceptable, then the processing proceeds to step S94.

In step S88, if it is determined that the processing of the command is acceptable, then the DPU 51 of the reader/writer 31 generates, in step S89, a command for causing the IC card 12 to implement value loading (a predetermined value is subtracted from the value of the electronic money recorded in a file for the IC card 12), and outputs the generated command to the SPU 52 through the bus 55. Then, predetermined processing is carried out in the SPU 52 and the modulating circuit 43 to generate a modulated wave for the command, and the modulated wave is output to the IC card 12 as an electromagnetic wave through the antenna 46.

In step S90, the antenna 73 of the IC card 12 receives the modulated wave from the antenna 46 of the reader/writer 31. The received modulated wave is subjected to predetermined processing in the interface 81, the BPSK demodulator 82, and the operation part 84 to implement command processing for the subtraction of electronic money recorded in the EEPROM 86, and the result is saved.

In step S91, the control unit 101 of the controller 32 notifies the acquirer/brand holder 1 of the processing result through the intermediary of the internal bus 102 and the network interface 107. The notification of command processing results may be performed sequentially each time the processing is implemented, or at a predetermined interval of, for example, one week or one month.

In step S92, the control unit 101 of the controller 32 generates a control signal for recording the log of a command processing result in the IC card 12, and transmits the generated control signal to the reader/writer 31 through the intermediary of the internal bus 102 and the network interface 107. The DPU 51 of the reader/writer 31 outputs a command to be transmitted to the IC card 12 to the SPU 52 through the bus 55 on the basis of the signal received through the intermediary of the SCC 53 and the bus 55. The command is subjected to predetermined processing in the SPU 52 and the modulating circuit 43 to generate a modulated wave for the command, and the modulated wave is output as an electromagnetic wave to the IC card 12 through the antenna 46.

In step S93, the antenna 73 of the IC card 12 receives the modulated wave from the reader/writer 31. The modulated wave undergoes predetermined processing in the interface 81, the BPSK demodulator 82, and the operation part 84, and the log of the command processing is written to the EEPROM 86 thereby to save it.

If it is determined in step S86 that the authentication of the IC card 12 is invalid, or if it is determined in step S88 that the command processing is not acceptable, then the control unit 101 of the controller 32 outputs an error message to the display unit 105 through the internal bus 102 to cause the display unit 105 to indicate the error message in step S94.

Referring now to the flowchart shown in FIG. 19, the descriptions will be given of the processing implemented when the user 3 having the IC card 12 purchases a commercial product or a service by using the affiliate merchant terminal unit 18-2.

Figure 18:
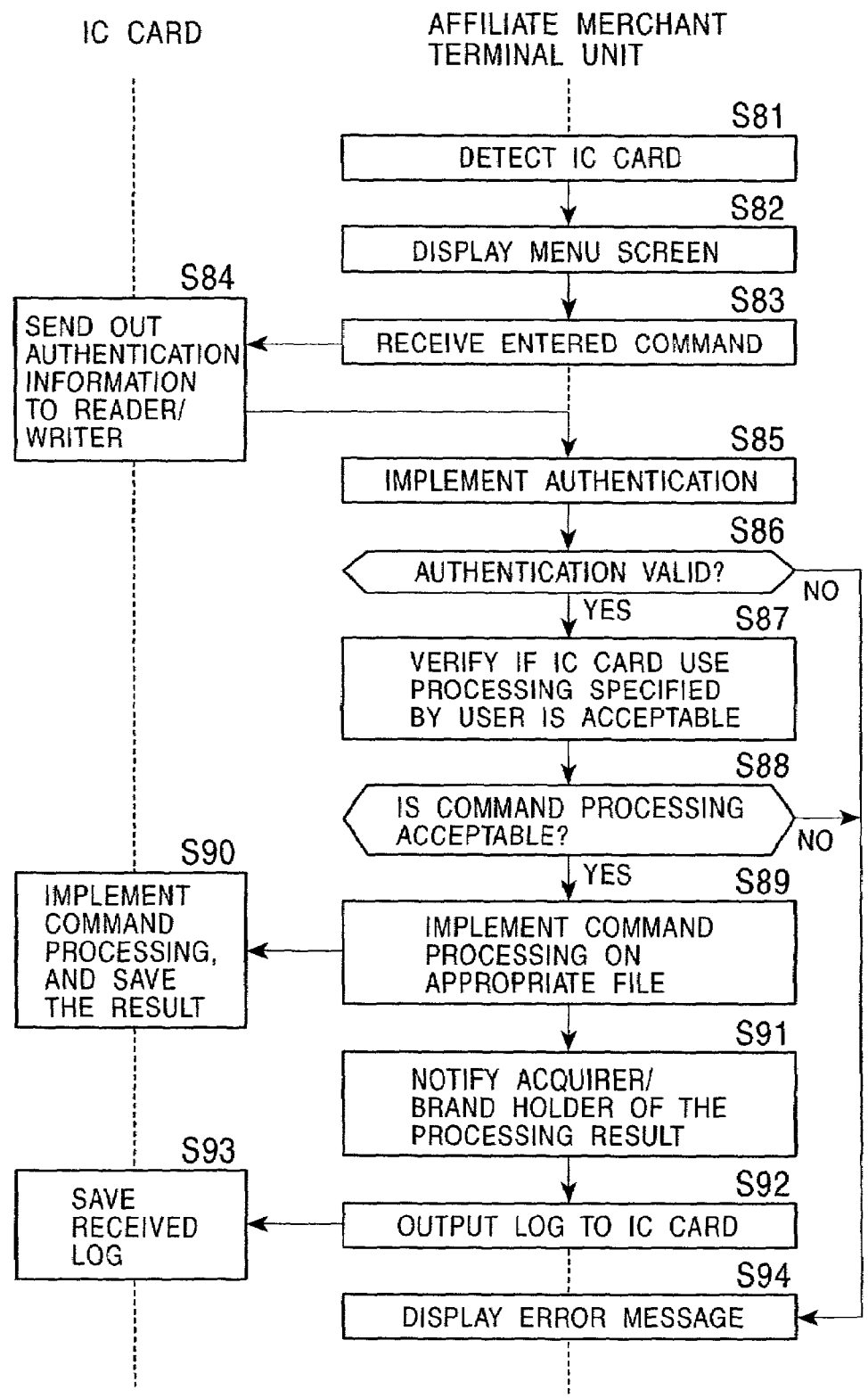
FIG. 18 is a flowchart illustrating the processing for the purchase of a commercial product or service by using an IC card at a store.

In step S101 through S104, the same processing as that in step S81 through S84 shown in FIG. 18 is carried out.

In step S105, the antenna 46 of the reader/writer 31 receives the authentication information transmitted from the IC card 12, and outputs the authentication information to the demodulating circuit 44. The authentication information that has been demodulated in the demodulating circuit 44 is subjected to predetermined processing, such as the BPSK modulation, in the SPU 52, then supplied to the DPU 51. The DPU 51 generates a signal requesting for authentication processing, and outputs the generated signal together with the received authentication information to the controller 32 through the intermediary of the bus 55 and the SCC 53. The control unit 101 of the controller 32 receives the signal requesting for authentication processing and the authentication information through the intermediary of the network interface 107 and the internal bus 102, then transmits them to the associated POS center 17 together with the command indicating the instruction of the user 3 through the intermediary of the internal bus 102 and the network interface 107.

In step S106, the CPU 121 of the POS center 17 reads out a key, which has been supplied from the acquirer/brand holder 1 and saved at the RAM 127 or the HDD 129, and performs authentication processing on the basis of the request for authentication processing and the authentication information received through the intermediary of the network interface 125, the input/output interface 122, and the internal bus 123.

In step S107, the CPU 121 of the POS center 17 determines whether authentication of the IC card 12 detected in step S101 has been found valid in the authentication processing implemented in step S106. If the CPU 121 determines in step S107 that the authentication of the IC card 12 has been found invalid, then the processing proceeds to step S117.

If it is determined in step S107 that the authentication of the IC card 12 has been found valid, then the CPU 121 of the POS center 17 notifies the affiliate merchant terminal unit 18-2 of the authentication having been found valid through the intermediary of the internal bus 123, the input/output interface 122, and the network interface 125 in step S108.

In step S109 through step S112, the same processing as that in step S87 through step S90 shown in FIG. 18 is carried out.

In step S13, the control unit 101 of the controller 32 notifies the POS center 17 of the processing result through the intermediary of the network interface 107 and the internal bus 102.

In step S114, the CPU 121 of the POS center 17 notifies the acquirer/brand holder 1 of the command processing result through the intermediary of the internal bus 123, the input/output interface 122, and the network interface 125. The notification of command processing results may be performed sequentially each time the processing is implemented, or at a predetermined interval of, for example, one week or one month.

In step S115 and step S116, the same processing as that of step S92 and step S93 shown in FIG. 18 is carried out.

If it is determined in step S107 that the authentication is invalid, or if it is determined in step S110 that the command processing is not acceptable, then the CPU 121 of the POS center 17 outputs an error message to the affiliate merchant terminal unit 18-2 through the intermediary of the internal bus 123, the input/output interface 122, and the network interface 125 in step S117.

In step S108, the same processing as that of step S94 shown in FIG. 18 is carried out.

Figure 17:
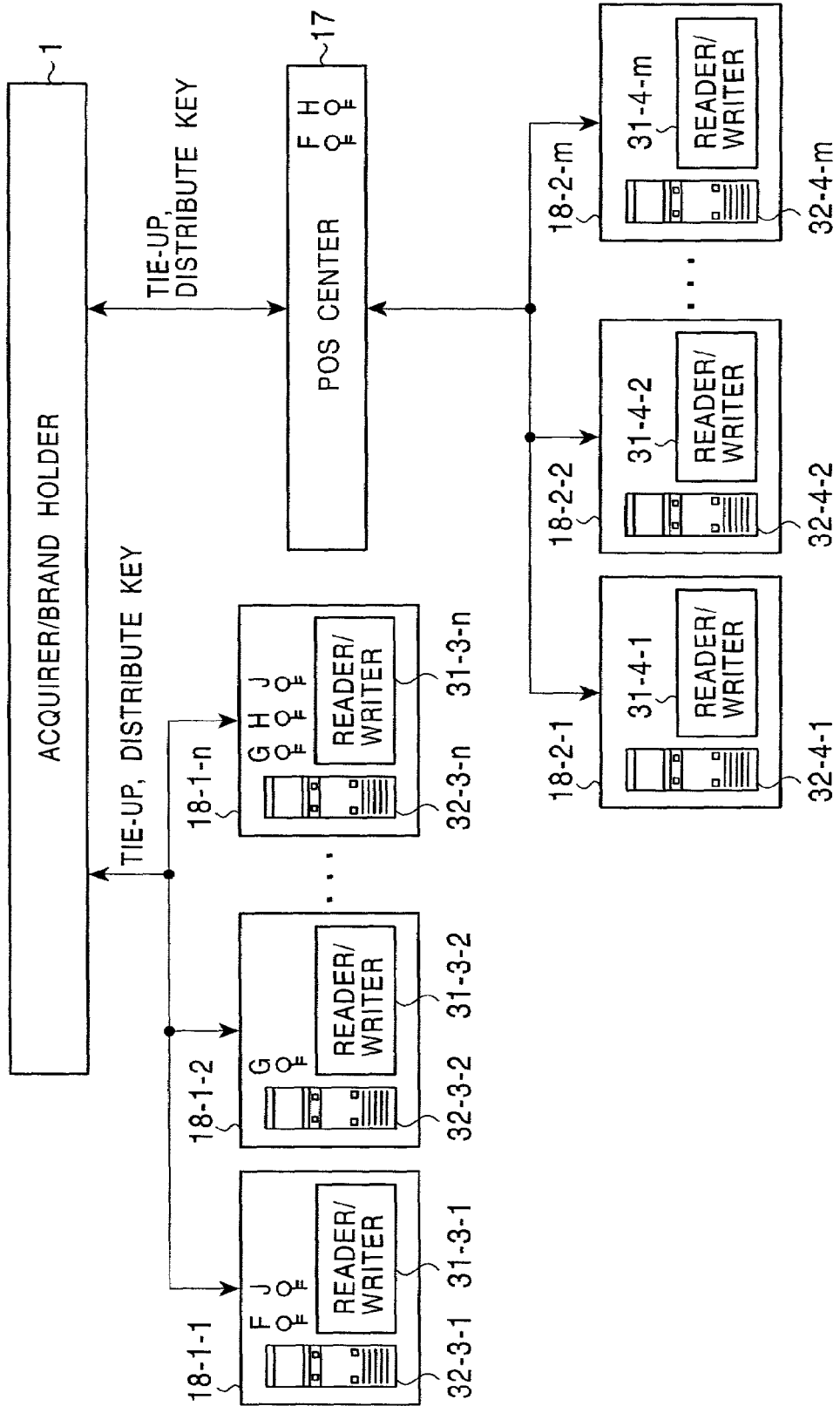
FIG. 17 is a diagram illustrating the dispositions of keys that make it possible to carry out the processing for the purchase of a commercial product or service by using an IC card at a store.
Figure 19:
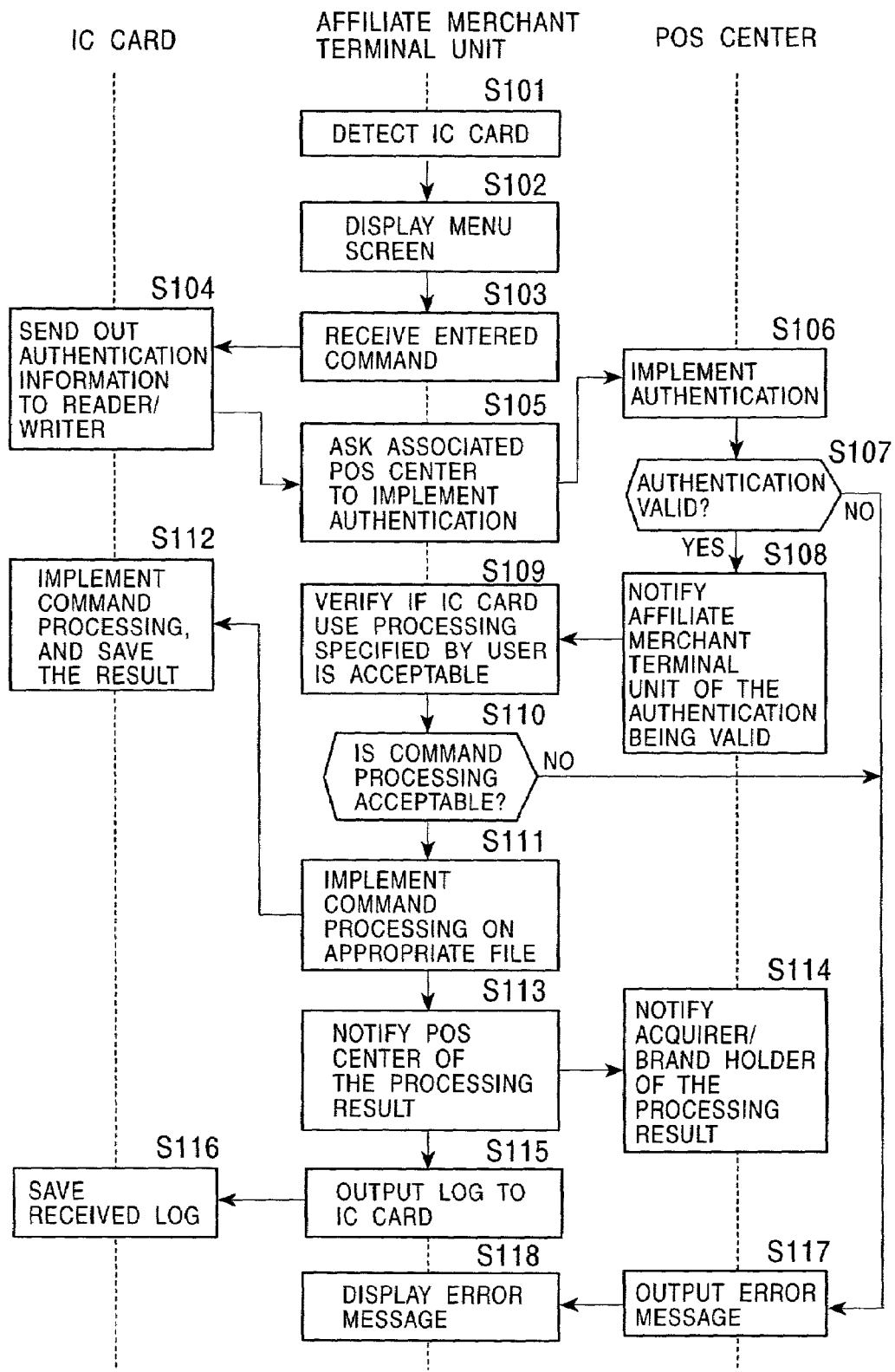
FIG. 19 is another flowchart illustrating the processing for the purchase of a product or service by using an IC card at a store.

In conjunction with FIG. 17 and FIG. 19, the descriptions have been made of the processing implemented when the user 3 having the IC card 12 uses the affiliate merchant terminal unit 18-2. Basically the same processing as that implemented at the affiliate merchant terminal unit 18-2 under the control of the POS center 17 is carried out when the MMK 20 under the control of the MMK center 19 is used.

Figure 20:
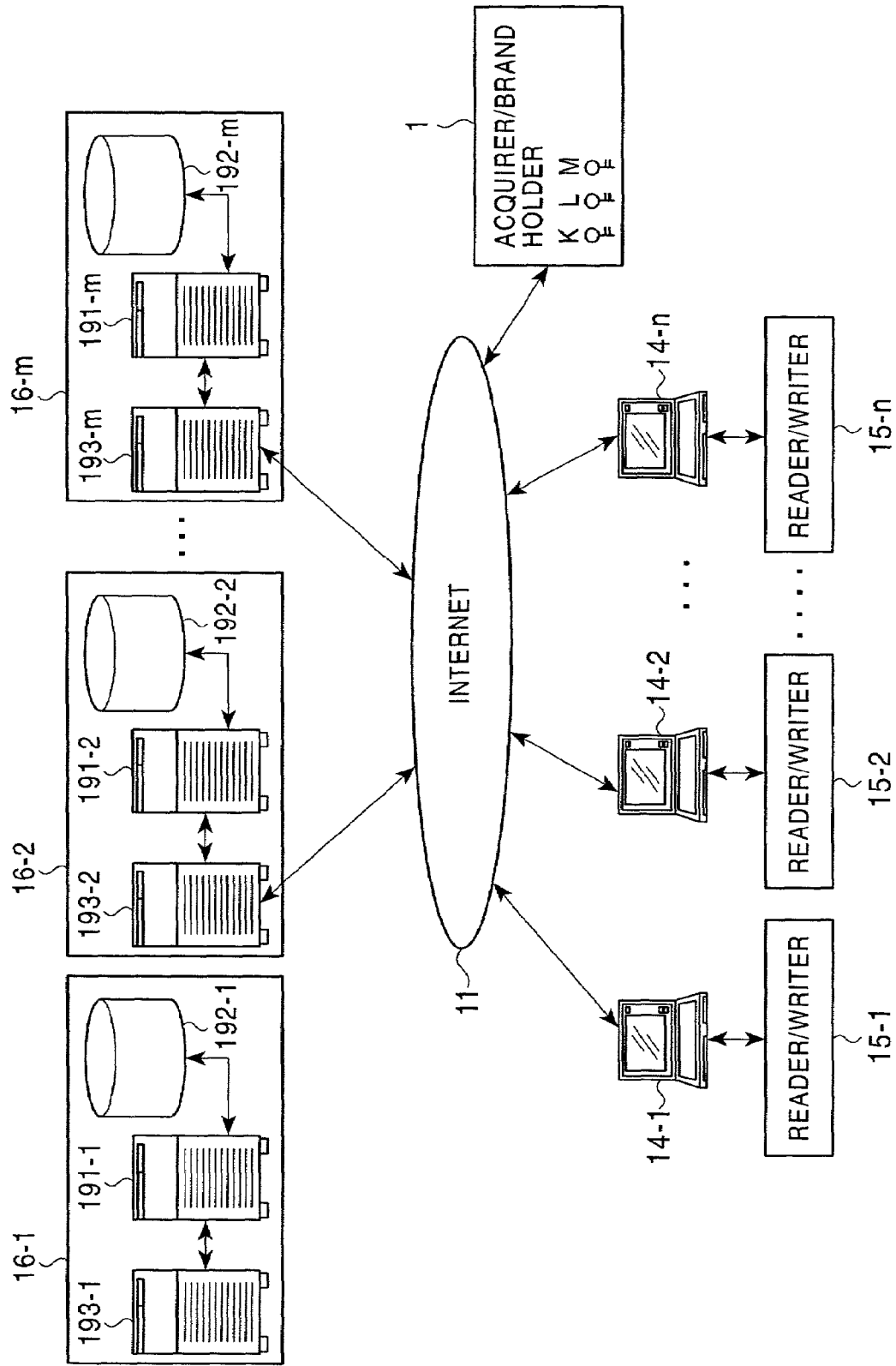
FIG. 20 is a diagram illustrating the dispositions of keys that make it possible to carry out the processing for the purchase of a product or service by using an IC card at a cybershop.

Referring now to FIG. 20, the detailed descriptions will be given of the processing carried out for the user 3 to purchase goods or use various types of services at the cybershop 16 opened on the Internet 11, without visiting an actual store, by using the electronic money loaded into the IC card 12, and the dispositions of the keys for carrying out the processing.

A plurality of cybershops 16-1 through 16-$m$ connected to the Internet 11 are arranged so as to be able to provide various types of services to the user 3 having the IC card 12 which uses the personal computer 14-1 through 14-$n$ that can be connected to the Internet 11 and the readers/writers 15-1 through 15-$n$ connected to the personal computers 14-1 through 14-$n$ according to a tie-up agreement with the acquirer/brand holder 1.

The cybershops 16-1 through 16-$m$ is equipped with, for example, web servers 193-1 through 193-$m$ that output a purchase request screen or the like over the Internet 11 to the personal computer 14 owned by the user 3 and receive, from the personal computer 14, authentication information of the IC card 12 or the information regarding a commercial product that the user 3 wishes to purchase, and sales management servers 191-1 through 191-$m$ that manage inventory/sales management DBs 192-1 through 192-$m$ for recording the inventories and sales of goods and carry out the processing for providing services.

In the following descriptions, unless it is necessary to individually distinguish among the sales management servers 191-1 through 191-$m$, the sales management servers will be generically referred to simply as the sales management server 191. Unless it is necessary to individually distinguish among the inventory/sales management DBs 192-1 through 192-$m$, the inventory/sales management DBs will be generically referred to simply as the inventory/sales management DB 192. Unless it is necessary to individually distinguish among the web servers 193-1 through 193-$m$, the web servers will be generically referred to simply as the web servers 193. The configurations of the sales management server 191 and the web server 193 are basically the same as those of the personal computer 14 that have been described in conjunction with FIG. 8; therefore, the explanation thereof will be omitted.

Even when a key K, a key L, or a key M is issued according to a tie-up agreement with each of the cybershop 16-1 through 16-$m$, the acquirer/brand holder 1 does not distribute the issued keys to the cybershops 16-1 through 16-$m$. The security server 145 of the acquirer/brand holder 1 registers in the key management DB 146 the individual keys issued to the cybershops 16-1 through 16-$m$, respectively. Hence, when an authentication processing request is received from any one of the cybershops 16-1 through 16-$m$, the security server 145 refers to the key management DB 146 to execute the authentication processing, and outputs the authentication processing result to the associated one of the cybershops 16-1 through 16-$m$ over the Internet 11.

In other words, the cybershops 16-1 through 16-$m$ do not record any keys. When the cybershops 16-1 through 16-$m$ receive the authentication information regarding the IC card 12, which has been read in by the reader/writer 15, from the personal computer 14 over the Internet 11, the cybershops output the authentication information to the acquirer/brand holder 1 over the Internet 11 to request for authentication processing, and receive the result of the authentication processing from the acquirer/brand holder 1 over the Internet 11.

Figure 21:
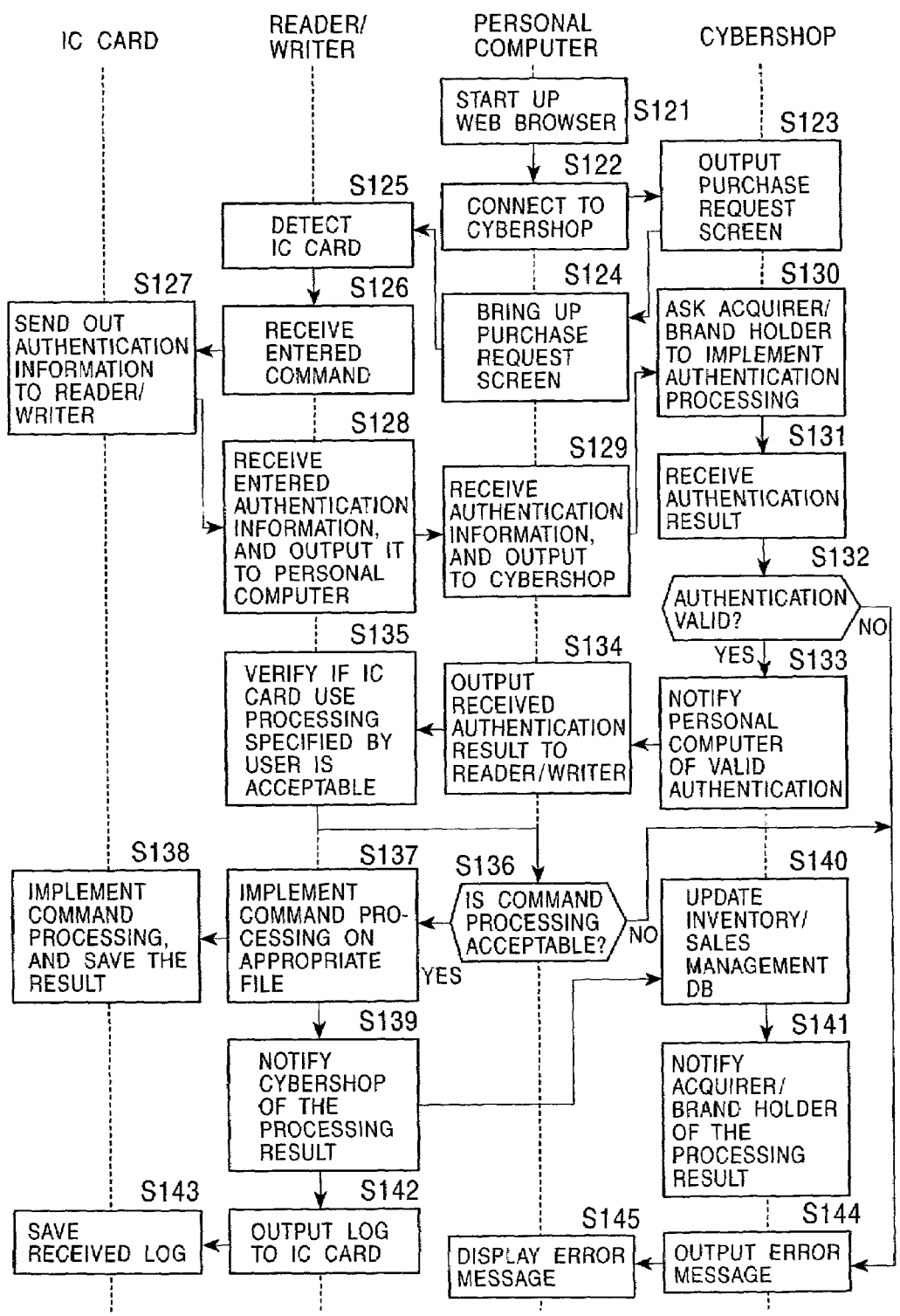
FIG. 21 is a flowchart illustrating the processing for the purchase of a commercial product or service by using an IC card at a cybershop.

Referring to the flowchart shown in FIG. 21, the descriptions will be given of the processing performed when the user 3 having the IC card 12 uses the personal computer 14 to access the cybershop 16 over the Internet 11 thereby to purchase goods or services.

In step S121, the same processing as that of step S21 shown in FIG. 15 is carried out.

In step S122, the CPU 121 of the personal computer 14 accesses the cybershop 16 through the intermediary of the internal bus 123, the input/output interface 122, the network interface 125, and the Internet 11.

In step S123, the web server 193 of the cybershop 16 outputs data associated with a purchase request screen to the personal computer 14 over the Internet 11.

In step S124, the CPU 121 of the personal computer 14 outputs the data associated with the purchase request screen, which has been received through the intermediary of the network interface 125, the input/output interface 122, and the internal bus 123, to the display unit 128 through the intermediary of the internal bus 123 and the input/output interface 122 to cause the display unit 128 to display an input request screen. The input request screen primarily shows a message prompting the user to set the IC card 12 at a predetermined reading position to allow the reader/writer 15 and the IC card 12 to communicate with each other, and a menu prompting an input operation. In this case, it is assumed that the purchase processing for a commercial product by using the IC card 12 has been selected and instructed by the user 3 by using the input unit 124.

In step S125 through step S128, the same processing as that of step S25 through step S28 shown in FIG. 15 is carried out.

In step S129, the CPU 121 of the personal computer 14 receives the authentication information through the intermediary of the network interface 125, the input/output interface 122, and the internal bus 123, and transmits the authentication information together with the command corresponding to the operation performed by the user 3 (the command for carrying out the processing for purchasing a commercial product by using the IC card 12 in this case) to the cybershop 16.

In step S130, the web server 193 of the cybershop 16 receives the authentication information, generates a signal for requesting authentication processing to the acquirer/brand holder 1, and outputs the generated signal together with the received authentication information to the acquirer/brand holder 1. The web server 150 of the acquirer/brand holder 1 outputs the received information to the security server 145. The security server 145 carries out authentication processing on the basis of the received authentication processing request and the authentication information by referring to the key that has been issued to the associated cybershop 16 and stored in the key management DB 146, and outputs the authentication processing result to the cybershop 16 over the Internet 11.

In step S131, the sales management server 191 of the cybershop 16 receives the authentication result from the acquirer/brand holder 1 over the Internet 11 and the web server 193, then determines in step S132 whether the authentication of the IC card 12, which was detected in step S125, has been proven valid. If it is determined in step S132 that the authentication of the IC card 12 is invalid, then the processing proceeds to step S144.

I step S133, the sales management server 191 of the cybershop 16 notifies the personal computer 14 of the authentication having been found valid through the intermediary of the web server 193 and the Internet 11.

In step S134, the CPU 121 of the personal computer 14 outputs the received authentication result to the reader/writer 15 through the intermediary of internal bus 123, the input/output interface 122, and the network interface 125.

In step S135, on the basis of the received authentication result, the DPU 51 of the reader/writer checks whether the processing for the use of the IC card specified by the user 3 (e.g., the purchase of a commercial product worth 2,000 yen) is acceptable (e.g., whether there is a balance of electronic money for the payment of the commercial product) primarily by reading necessary information from the IC card 12, transmitting a sales approval request to the acquirer/brand holder 1 through the intermediary of the personal computer 14 and the Internet 11, and receiving a response to the sales approval request.

In step S136, the DPU 51 of the reader/writer 15 outputs a response signal, which is received through the antenna 46 in response to an inquiry from the IC card 12, to the personal computer 14 through the intermediary of the bus 55 and the SCC 53. The CPU of the personal computer 14 determines whether the processing of the command is acceptable on the basis of the response received from the reader/writer 15 and the response to the sales approval request received from the acquirer/brand holder 1 over the Internet 11. If it is determined in step S136 that the processing for the command is not acceptable, then the processing proceeds to step S144.

If it is determined in step S136 that the processing for the command is acceptable, then the DPU 51 of the reader/writer 15 generates, in step S137, a command for causing the IC card 12 to carry out value loading (a predetermined value is subtracted from the value of the electronic money recorded in a file for the IC card 12), and outputs the generated command to the SPU 52 through the bus 55. Then, predetermined processing is carried out in the SPU 52 and the modulating circuit 43 to generate a modulated wave for the command, and the modulated wave is output to the IC card 12 as an electromagnetic wave through the antenna 46.

In step S138, the same processing as that of step S90 shown in FIG. 18 is carried out.

In step S139, the DPU 51 of the reader/writer notifies the cybershop 16 of the command processing result through the intermediary of the bus 55, the SCC 53, the personal computer 14, and the Internet 11.

In step S140, the sales management server 191 of the cybershop 16 updates the inventory/sales management DB 192 in step S140, and notifies the acquirer/brand holder 1 of the processing result through the intermediary of the web server 193 and the Internet 11 in step S141. The notification of the command processing results may be performed sequentially each time the processing is implemented, or at a predetermined interval of, for example, one week or one month.

In step S142 and step S143, the same processing as that of step S39 and step S40 shown in FIG. 15 is carried out.

If it is determined that the authentication is invalid in step S132, or if it is determined in step S136 that the command processing is not acceptable, then the sales management server 191 of the cybershop 16 outputs an error message to the personal computer 14 through the intermediary of the web server 193 and the Internet 11 in step S144.

In step S145, the same processing as that of step S42 shown in FIG. 15 is carried out.

In the processing described above, the descriptions have been made of the cases where the transfer of information is implemented by using a contactless IC card. Alternatively, the hardware for recording information regarding electronic money, etc. and for performing a variety of processing may be formed of various other information processing devices, such as, for example, a contact type IC card, a portable telephone, a PDA, a personal computer, or timepiece.

A series of the processing steps described above may alternatively be implemented by software. The software is installed from a recording medium into a computer wherein a program constituting the software has been incorporated in the dedicated hardware thereof, or in a general-purpose personal computer, for example, that is capable of implementing a variety of functions by installing diverse programs.

As shown in FIG. 4, FIG. 7, or FIG. 8, the recording medium is constructed by a magnetic disk 65, 111, or 131 (including a floppy disk), an optical disk 66, 112, or 132 (including CD-ROM and DVD), a magneto-optical disk 67, 113, or 133 (including MD), or a package medium formed of a semiconductor memory 68, 114, or 134, etc. in which the program has been recorded. These recording media are distributed separately from computers in order to provide the program to users.

In the present specification, the steps describing the program recorded in a recording medium of course include the processing in which the steps are carried out in time series according to the sequence described, and also include the processing carried out in parallel or separately rather than being carried out in time series.

In the present specification, the term "system" refers to an entire apparatus constructed by a plurality of devices.

Thus, according to the inventive information processing system, information processing method, and program recorded in a recording medium, information is exchanged with the third information processing apparatus managed by the second business entity that issues the second information processing apparatus in which electronic money information and authentication information used for authentication processing related to an electronic money service are recorded, information is exchanged with a fourth information processing apparatus managed by the third business entity that provides a service using electronic money, the authentication information used for the authentication processing related to the electronic money service is recorded, the information regarding the second business entity and the information regarding a tie-up agreement between the first business entity and the second business entity are recorded, the information regarding the third business entity and the information regarding a tie-up agreement between the first business entity and the third business entity are recorded, the authentication information is output on the basis of the information regarding the tie-up agreement between the first business entity and the second business entity, and the authentication information is output on the basis of the information regarding the tie-up agreement between the first business entity and the third business entity. Hence, in an electronic money business, the distribution of cryptographic keys to issuers and affiliate merchants, and the operation and management of a system can be integrated in an information processing system managed by a business entity managing a single brand, thus enabling the business entity to reduce necessary cost.

According to the inventive electronic money service providing system, the first information processing apparatus exchanges information with the third information processing apparatus managed by the second business entity, exchanges information with the fourth information processing apparatus managed by the third business entity, records the authentication information used for the authentication processing related to an electronic money service, records the information regarding the second business entity and the information regarding a tie-up agreement between the first business entity and the second business entity, records the information regarding the third business entity and the information regarding a tie-up agreement between the first business entity and the third business entity, outputs the authentication information on the basis of the information regarding the tie-up agreement between the first business entity and the second business entity, and outputs the authentication information on the basis of the information regarding the tie-up agreement between the first business entity and the third business entity. The second information processing apparatus records the authentication information, and also records electronic money information. The third information processing apparatus exchanges information with the first information processing apparatus, records the received authentication information, records the information regarding the issuance of the second information processing apparatus, and carries out the authentication processing with the second information processing apparatus on the basis of the recorded authentication information. The fourth information processing apparatus exchanges information with the first information processing apparatus, records received authentication information, and carries out authentication processing with the second information processing apparatus on the basis of the recorded authentication information. Hence, a number of issuers and affiliate merchants can participate in a single brand, and the cost required for distributing cryptographic keys to the issuers and affiliate merchants and for running and managing a system can be reduced.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing system comprising:
a first information processing apparatus managed by a first business entity performing the management of an electronic money brand in an electronic money service and the management of an affiliate business entity in the electronic money service;
first information giving and receiving means for giving and receiving information with a third information processing apparatus managed by a second business entity issuing a second information processing apparatus in which electronic money information and authentication information employed for authentication processing for the electronic money service are recorded, the authentication information including a plurality of keys associated with a plurality of business entities;
second information giving and receiving means for giving and receiving information with a fourth information processing apparatus managed by a third business entity providing a service that uses the electronic money, wherein the second information giving and receiving means is in communication with a plurality of reader/writer devices associated with the third business entity and operable to communicate with the second information processing apparatus wherein the reader/writer devices do not store the authentication information recorded in the second information processing apparatus;
first recording means for recording the authentication information used for the authentication processing for the electronic money service;
second recording means for recording the information regarding the second business entity and the information regarding a tie-up agreement between the first business entity and the second business entity;
third recording means for recording the information regarding the third business entity and the information regarding a tie-up agreement between the first business entity and the third business entity; and
fourth recording means for recording proxy transactions where the fourth recording means records and completes transactions executed by the first business entity and associated with the second business entity without being in active communication with the second business entity, and where the fourth recording means communicates with the second business entity at a predetermined interval,
wherein the first information processing apparatus determines the acceptability of a value loaded on the second processing apparatus based on information related to the electronic money information.

2. An information processing system according to claim 1, wherein
the first information giving and receiving means outputs the authentication information recorded by the second recording means on the basis of the information regarding the tie-up agreement between the first business entity and the second business entity that has been recorded by the second recording means, and
the second information giving and receiving means outputs the authentication information recorded by the first recording means on the basis of the information regarding the tie-up agreement between the first business entity and the third business entity that has been recorded by the third recording means.

3. An information processing system according to claim 1, further comprising first accounting means for carrying out accounting with the second business entity, and second accounting means for carrying out accounting with the third business entity.

4. An information processing system according to claim 1, further comprising authenticating means for carrying out authentication processing using the authentication information recorded by the first recording means,
wherein the authenticating means carries out authentication processing by using the authentication information associated with the third business entity recorded by the first recording means when a signal requesting the implementation of authentication processing is received from the third business entity by the second information giving and receiving means.

5. An information processing system according to claim 1, further comprising:
third information giving and receiving means for giving and receiving information, through a network, with a fifth information processing apparatus that rewrites the electronic money information recorded in the second information processing apparatus; and
generating means for generating a control signal causing the fifth information processing apparatus to carry out the loading of electronic money into the second information processing apparatus,
wherein the generating means generates the control signal for the second information processing apparatus, which has been issued by the second business entity, on the basis of information regarding the tie-up agreement between the first business entity and the second business entity that has been recorded by the second recording means, and
the third information giving and receiving means outputs the control signal generated by the generating means to the fifth information processing apparatus.

6. An information processing system according to claim 1, wherein the network is the Internet, and
the third information giving and receiving means further exchanges information with a sixth information processing apparatus managed by the third business entity having a virtual store on the Internet.

7. An information processing system according to claim 1, wherein the second information processing apparatus stores a log of value loading results.

8. An information processing system according to claim 1, wherein the first information processing apparatus sends a value loading processing result to the second business entity.

9. An information processing method for a first information processing apparatus managed by a first business entity that performs the management of an electronic service brand and the management of an electronic money service affiliate business entity, comprising:
a first information giving and receiving step for giving and receiving information with a second information processing apparatus managed by a second business entity issuing a portable electronic device in which electronic money information and authentication information used for authentication processing related to the electronic money service are recorded, wherein the authentication information includes a plurality of authentication keys associated with a plurality of business entities;
a second information giving and receiving step for giving and receiving information with a third information processing apparatus managed by a third business entity providing a service that uses the electronic money;
a first recording step for recording the authentication information used for authentication processing related to the electronic money service, wherein the first recording step is performed under the management of the first business entity;
a second recording step for recording information regarding the second business entity and information regarding a tie-up agreement between the first business entity and the second business entity, wherein the second recording step is performed under the management of the first business entity;
a third recording step for recording information regarding the third business entity and information regarding a tie-up agreement between the first business entity and the third business entity, wherein the third recording step is performed under the management of the first business entity;
a fourth recording step for recording and executing proxy transactions executed by the first business entity and associated with the second business entity, wherein the fourth recording step is performed under the management of the first business entity without an active connection to the second business entity and where a connection is formed with the second business entity at a predetermined interval, and
a determining step for determining whether a value loaded on the portable electronic device is acceptable based on information related to the electronic money information,
wherein, in the first information giving and receiving step, the authentication information, which has been recorded by the processing of the first recording step, is output on the basis of the information regarding the tie-up agreement between the first business entity and the second business entity that has been recorded by the processing of the second recording step, and
in the second information giving and receiving step, the authentication information, which has been recorded by the processing of the first recording step, is output on the basis of the information regarding the tie-up agreement between the first business entity and the third business entity that has been recorded by the processing of the third recording step.

10. An information processing method according to claim 9, wherein the portable electronic device stores a log of value loading results.

11. An information processing method according to claim 9, further comprising a notification step for sending a value loading processing result to the second business entity.

12. A recording medium in which a computer-readable program for a first information processing apparatus managed by a first business entity that manages an electronic money brand in an electronic money service, and acquires and manages an affiliate business entity of the electronic money service has been recorded, the program comprising:
a first information giving and receiving step for giving and receiving information with a third information processing apparatus managed by a second business entity issuing a second information processing apparatus in which electronic money information and authentication information used for authentication processing related to the electronic money service are recorded, wherein the authentication information includes a plurality of authentication keys associated with a plurality of business entities;

a second information giving and receiving step for giving and receiving information with a fourth information processing apparatus managed by a third business entity providing a service that uses the electronic money;

a first recording step for recording the authentication information used for authentication processing related to the electronic money service, wherein the first recording step is performed under the management of the first business entity;

a second recording step for recording information regarding the second business entity and information regarding a tie-up agreement between the first business entity and the second business entity, wherein the second recording step is performed under the management of the first business entity;

a third recording step for recording information regarding the third business entity and information regarding a tie-up agreement between the first business entity and the third business entity, wherein the third recording step is performed under the management of the first business entity; and a fourth recording step for recording and executing proxy transactions executed by the first business entity and associated with the second business entity, wherein the fourth recording step is performed under the management of the first business entity without an active connection to the second business entity and where a connection is formed with the second business entity at a predetermined interval, and a determining step for determining whether a value loaded on the second information processing apparatus is acceptable based on information related to the electronic money information, wherein, in the first information giving and receiving step, the authentication information, which has been recorded by the processing of the first recording step, is output on the basis of the information regarding the tie-up agreement between the first business entity and the second business entity that has been recorded by the processing of the second recording step, and in the second information giving and receiving step, the authentication information, which has been recorded by the processing of the first recording step, is output on the basis of the information regarding the tie-up agreement between the first business entity and the third business entity that has been recorded by the processing of the third recording step.

13. A recording medium according to claim 12, wherein the second information processing apparatus stores a log of value loading results.

14. A recording medium according to claim 12, further comprising a notification step for sending a value loading processing result to the second business entity.

15. An electronic money service providing system comprising:

a first information processing apparatus managed by a first business entity that manages an electronic money brand in an electronic money service, and acquires and manages an affiliate business entity of the electronic money service;

a second information processing apparatus in which electronic money information and authentication information used for authentication processing for the electronic money service are recorded;

a third information processing apparatus managed by a second business entity issuing the second information processing apparatus; and a fourth information processing apparatus managed by a third business entity providing a service that uses the electronic money;

wherein the first information processing apparatus comprises:

first information giving and receiving means for giving and receiving information with the third information processing apparatus managed by the second business entity;

second information giving and receiving means for giving and receiving information with the fourth information processing apparatus managed by the third business entity;

first recording means for recording the authentication information used for the authentication processing for the electronic money service;

second recording means for recording the information regarding the second business entity and the information regarding a tie-up agreement between the first business entity and the second business entity;

third recording means for recording the information regarding the third business entity and the information regarding a tie-up agreement between the first business entity and the third business entity; and a fourth means for executing and recording the information regarding proxy transactions executed by the first business entity and associated with the second business entity without being in active communication with the second business entity, and where the fourth recording means communicates with the second business entity at a predetermined interval, the first information giving and receiving means outputs the authentication information, which has been recorded by the first recording means, on the basis of the information regarding a tie-up agreement between the first business entity and the second business entity that has been recorded by the second recording means, the second information giving and receiving means outputs the authentication information, which has been recorded by the first recording means, on the basis of the information regarding a tie-up agreement between the first business entity and the third business entity that has been recorded by the third recording means, the first information processing apparatus for determining the acceptability of a value loaded on the second information processing apparatus based on information related to the electronic money information, the second information processing apparatus comprises:

fourth recording means for recording the authentication information output to the third information processing apparatus by the first information giving and receiving means; and fifth recording means for recording the electronic money information, the third information processing apparatus comprises:

third information giving and receiving means for giving and receiving information with the first information processing apparatus;

sixth recording means for recording the authentication information input by the third information giving and receiving means;

seventh recording means for recording information regarding the issuance of the second information processing apparatus; and first authentication processing means for implementing authentication processing with the second information processing apparatus on the basis of the authentication information recorded by the sixth recording means, wherein the authentication information includes a plurality of authentication keys associated with a plurality of business entities, and the fourth information processing apparatus comprises:

fourth information giving and receiving means for giving and receiving information with the first information processing apparatus;

eighth recording means for recording the authentication information input by the fourth information giving and receiving means; and second authentication processing means for implementing authentication processing with the second information processing apparatus on the basis of the authentication information recorded by the eighth recording means.

16. An electronic money service providing system according to claim 15, wherein the third information processing apparatus further comprises fifth information giving and receiving means for giving and receiving information with a plurality of fifth information processing apparatuses that carry out processing for rewriting the electronic money information recorded by the fifth recording means of the second information processing apparatus, and the first authenticating means carries out authentication processing on the basis of the authentication information that has been input by the fifth information giving and receiving means and recorded by the fourth recording means of the second information processing apparatus.

17. An electronic money service providing system according to claim 15, wherein the fourth information processing apparatus further comprises fifth information giving and receiving means for giving and receiving information with a plurality of fifth information processing apparatuses that carry out processing for rewriting the electronic money information recorded by the fifth recording means of the second information processing apparatus, and the second authenticating means cames out authentication processing on the basis of the authentication information that has been input by the fifth information giving and receiving means and recorded by the fourth recording means of the second information processing apparatus.

18. An electronic money service providing system according to claim 15, wherein the fourth information processing apparatus further comprises:

fifth information giving and receiving means for giving and receiving information with the second information processing apparatus; and generating means for generating a control signal for rewriting the electronic money information recorded by the fifth recording means of the second information processing apparatus, and the second authenticating means for carrying out authentication processing on the basis of the authentication information that has been input by the fifth information giving and receiving means and recorded by the fourth recording means of the second information processing apparatus.

19. An electronic money service providing system according to claim 15, wherein the second information processing apparatus further comprises ninth recording means for recording an application for implementing at least one function among a personal authentication card, an entering and leaving key, a commuter ticket, a point card, a membership card, a cash card, a credit card, and a loan card.

20. An electronic money service providing system according to claim 15, wherein the second information processing apparatus is an IC card, a portable telephone, an information processing terminal, a personal computer, or a timepiece.

21. An electronic money service providing system according to claim 15, wherein the second information processing apparatus stores a log of value loading results.

22. An electronic money service providing system according to claim 15, wherein the first information processing apparatus sends a value loading processing result to the second business entity.

* * * * *